United States Patent [19]

Shiraishi

[11] Patent Number: 5,075,539
[45] Date of Patent: Dec. 24, 1991

[54] METHOD AND APPARATUS FOR ADJUSTING THE POSITION OF IMAGE READING EQUIPMENT

[75] Inventor: Ryuichi Shiraishi, Kanagawa, Japan

[73] Assignee: Fuji Xerox Co., Ltd., Tokyo, Japan

[21] Appl. No.: 533,147

[22] Filed: Jun. 6, 1990

[30] Foreign Application Priority Data

Jun. 7, 1989 [JP] Japan ................................. 1-146044

[51] Int. Cl.$^5$ ............................................. H01J 40/14
[52] U.S. Cl. ................................. 250/208.1; 358/497
[58] Field of Search ............................. 250/208.1, 339; 358/483, 488, 497

[56] References Cited

U.S. PATENT DOCUMENTS 4,457,017 6/1984 Onogi et al. ..................... 250/208.1
4,641,199 2/1987 Miyagi ............................. 250/208.1
4,682,042 7/1987 Igarashi ........................... 250/208.1

Primary Examiner—David C. Nelms
Assistant Examiner—Khaled Shami
Attorney, Agent, or Firm—Finnegan, Henderson, Farabow, Garrett and Dunner

[57] ABSTRACT

An apparatus and method for adjusting the location of the image sensor in an image reading device is disclosed. The image sensor may be adjusted around or along any of three mutually perpendicular axes which intersect the optical lens system of the image reading device.

37 Claims, 15 Drawing Sheets

METHOD AND APPARATUS FOR ADJUSTING THE POSITION OF IMAGE READING EQUIPMENT

FIELD OF THE INVENTION

The present invention relates to image reading equipment used for the input of image data into digital copying machines, facsimile machines, printers, and the like, and more particularly to methods and apparatus for adjusting the position of the image reading equipment in a reducing optical system whereby the optical images from the original sheet are reduced by means of an optical lens unit and projected onto a reading sensor.

BACKGROUND OF THE INVENTION

With respect to copying machines, for example, it has been proposed to employ image reading equipment with a reducing optical system therein. The image reading equipment with this reducing optical system includes a fluorescent lamp or a halogen lamp, which irradiates the original sheet in order to form optical images for reading, a mirror unit, which is composed of a full rate mirror (FRM) and a half rate mirror (HRM) and transmits the optical images, an optical lens unit, which reduces the optical images received from this mirror unit and projects them to form their images on the organic photo-sensitive material belt, and so forth.

On the other hand, digital color copying machines have been the subject of research in recent years, and certain types have been developed. The present applicant has filed application for a patent on a digital copying machine (for example, U.S. patent application Ser. No. 292195-1988). This digital color copying machine is provided with an image input terminal (IIT), which reads the images on the color original sheet for each of the three primary colors of light, namely, red (R), green (G), and blue (B), and then converts the read data into electric digital density signals through photoelectric conversion.

This IIT is comprised of an imaging unit, which is provided with an exposing lamp, a rod lens array and a CCD line sensor which scans the original sheet and thereby optically reads the images thereon, a driving means, which drives the imaging unit for its movement, electrical hardware, which performs the process of conversion of the electric read signals generated by the CCD line sensor, and so forth.

With such a digital color copying machine, it is possible to perform various processes in an easy and simple way since the machine applies digital processing to the image signals, and it is consequently possible to obtain color copies with high image quality.

The imaging unit in the IIT employed in this digital color copying machine is a close-coupled type image reader, and its construction is therefore relatively large. However, it is desired to build the equipment in as compact a size as possible. Moreover, with respect to those copying machines which are capable of processing original sheets up to the Japanese standard A3 paper size, i.e. those forms of paper in sizes in most frequent general use, it is necessary to provide the copying machine with a CCD line sensor with a length not shorter than the shorter side, i.e., 297 mm, of the A3 paper. Accordingly, this means that not only is the CCD line sensor itself more costly, but also processing operations using it are much more expensive. Therefore, it is desirable to apply reducing type image reading equipment as described above to the IIT of the digital color copying machine just described.

A three-line sensor (a three-color linear sequential sensor), which is provided with lines of picture elements arranged above and below with color filters having spectral sensitivity for R, G, and B has been developed for use as a reading sensor composed of CCD line sensors. For the application of this sensor to a color copying machine, the depth of focus is set for the lens in such a manner that the resolution (MTF) of the lens unit will be 40 per cent or more for the original sheet in 51 p/mm, for example.

However, in image reading equipment in which a reducing type optical system is employed, the equipment sometimes fails to perform an accurate reading of images. This happens because it is not possible to attain the required resolution (MTF) unless the reading sensor is installed precisely in its specified position. Above all, as shown in FIG. 24 of this application, considerable differences may occur in the location of the sensors for the individual colors in the construction of the three-line sensor 217, which has three lines of picture elements for R, G, and B, respectively. These lines of picture elements are arranged in the vertical direction, with a fairly large distance between the line sensors R and B, which are respectively positioned on the two ends. The depth of focus will be different by [d] between R and B if the optical images read from the original sheet are input slanted in the upward and downward direction, as illustrated with the two-dot chain line in FIG. 24.

SUMMARY OF THE INVENTION

The present invention was conceived to solve these problems, and its object is to offer a method and an apparatus for making adjustments in the position of image reading equipment wherein the position of the equipment may be adjusted in six directions in order to install the reading sensor precisely in its specified position.

Another object of the present invention is to offer a method and an apparatus for adjusting the position of image reading equipment whereby the above-mentioned adjustment of the position can be performed in an easy and simple manner.

Still another object of the present invention is to offer a method and an apparatus for adjusting the position of an image reading equipment wherein the position of the reading sensor may be adjusted in six directions and yet not much space is required for the installation of the position adjusting mechanism.

Still another object of the present invention is to offer a method and an apparatus for adjusting the position of the image reading equipment wherein the position of the equipment may be properly adjusted even if a large optical lens is employed in the equipment.

In order to overcome the problems mentioned above, the method and apparatus according to the present invention are designed to adjust the position of the reading sensor by moving it along the direction of the three axes crossing at right angles with each other and also rotating the reading sensor round the said three axes. Accordingly, when a three-line sensor is employed as the reading sensor, the present invention is capable of adjusting the reading sensor in the upward and downward tilting direction in any way necessary to adjust the difference in resolution (MTF) for each of R, G, and B to the achievable minimum, even if optical images are input into the reading sensor slanted in the upward or downward direction.

Also, an eccentric cam is provided for the adjustment of the positions of the reading sensor and the optical lens, and, as the position of the reading sensor is adjusted with this eccentric cam, fine adjustment of the reading sensor can be performed continually and smoothly.

Moreover, as the adjustment of the position of the optical lens is made by a speed reducing means with a rack and pinion mechanism, the fine adjustment of the optical lens can be made in an easy and simple way even if the lens is a large optical lens like the one used in a color copying machine.

Furthermore, the present invention not only makes it possible to perform the adjustments in a simple manner. The adjustments are made in the mounting position of the reading sensor with the adjusting positions concentrated in one in one place. Finally, the adjusting mechanism can be constructed compactly and thus is light in weight.

BRIEF DESCRIPTION OF THE DRAWINGS

The manner by which the above objects and other objects, features and advantages of the present invention are attained will be fully evident from the following detailed description when it is considered in light of the drawings, wherein.

DETAILED DESCRIPTION OF THE PREFERRED EMBODIMENT

Figure 1A:
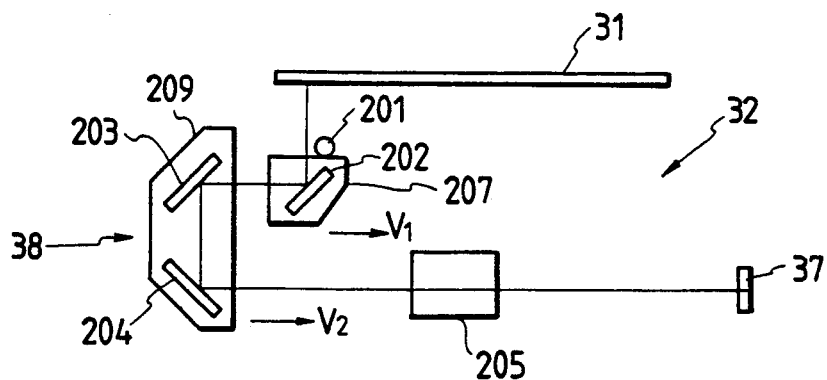
FIGS. 1a-1d are schematic drawing illustrating the reducing type image input terminal (IIT) and the reading sensor which are used for the image reading equipment according to the present invention.
Figure 1B:
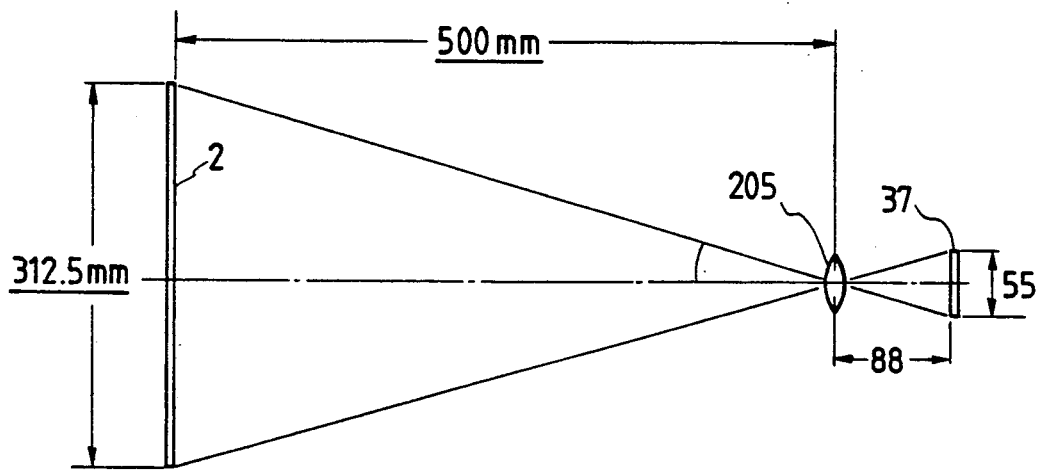
Figure 1C:
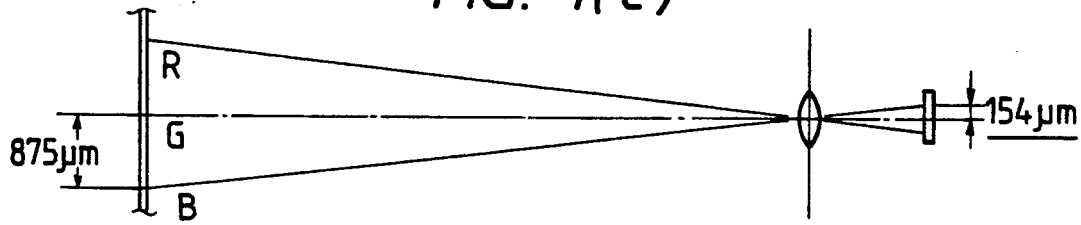
Figure 1D:
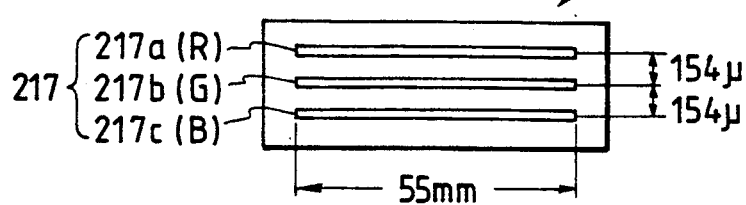

Reference will now be made in detail to the method according to the present invention and the construction of the apparatus proposed in the present invention as illustrated in the accompanying drawings, in which like reference characters designate like or corresponding parts throughout the several drawings.

In the description to follow, some examples of the preferred embodiments of the present invention will be used as examples. It should be understood, however, that the present invention is not limited to these examples of its embodiment, but may be applied effectively to other forms of its embodiment to such an extent as will not deviate from the technical scope defined for the present invention.

Figure 21:
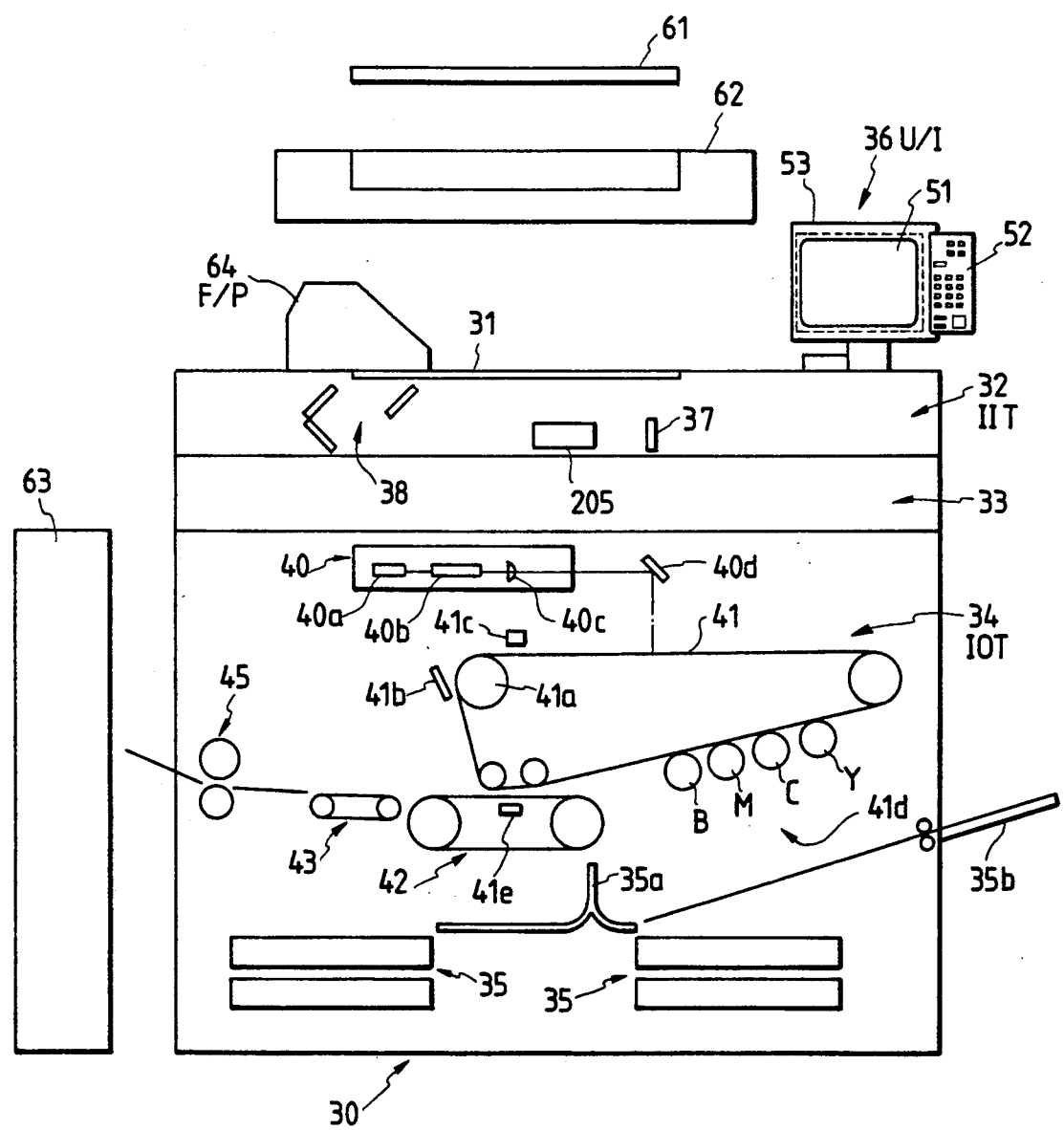
FIG. 21 is a schematic drawing illustrating the overall construction of the color copying machine to which the present invention is applied.
Figure 22:
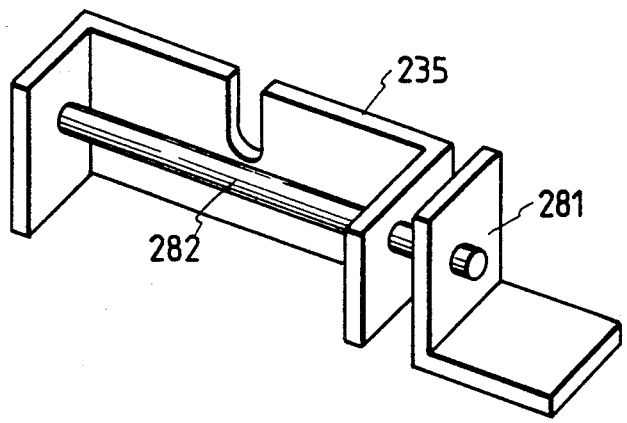
FIG. 22 illustrates another example of the adjusting mechanism in the tilting direction.

FIG. 21 illustrates one example of the overall construction of the color copying machine to which the present invention is applied.

In the color copying machine to which the present invention is applied, the base machine 30, which forms the main unit in the basic construction of the copying machine, is comprised of a platen glass 31, on the upper surface of which an original sheet is placed, an image input terminal (IIT) 32, an electrical control system housing section 33, an image output terminal (IOT) 34, a paper tray 35, and a user interface (U/I) 36. There is additionally provided an editing pad 61, an automatic document feeder (ADF) 62, a sorter 63, and a film projector (F/P) 64, which are optional parts.

Electrical hardware is necessary for performing control over the IIT, the IOT, the U/I, and the other parts mentioned above. The electrical hardware is divided into a plurality of boards for such individual units of processing as the IIT, the IPS, which performs the image processing of the output signals from the IIT, the U/I, and the F/P. These boards are accommodated in the electrical control system housing section 33, together with the SYS board, which controls the above-mentioned boards, and the master control board (MCB), which controls the IOT, the ADF, the sorter, etc.

The IIT 32 is composed of a reading sensor 37, which is comprised of CCD line sensors, etc., and a scanning optical mechanism, which is comprised of a plurality of scanning mirrors 38 and an optical lens 205, which projects the optical images read from the original sheet onto the reading sensor 37 for the formation of images thereon, and so forth. The IIT 32 reads a color original sheet for each of the primary colors of light, namely, blue (B), green (G), and red (R), converts the signals so obtained into digital image signals, and outputs the converted signals to the IPS.

The IPS converts the B, G, and R signals from the IIT 32 mentioned above into the primary colors of the toner, namely, yellow (Y), cyan (C), magenta (M), and black (K), and, after performing various data processing operations on the signals in order to enhance the reproducibility of such features as color, chromatic gradation, and the precise definition of details, the IPS further converts the toner signals expressive of the chromatic gradation of the process color into toner signals in binary values, i.e. on or off, and then outputs the signals to the IOT 34.

The IOT 34 is provided with a scanner 40 and a photo-sensitive material belt and converts the image signals from the IPS mentioned above into optical signals in its laser output section 40a and forms a latent image corresponding to the image found on the original sheet on the photosensitive material belt 41 via a polygon mirror 40b, a F/[theta] lens 40c, and a reflecting mirror 40d. The photosensitive material belt 41 is driven with a driving pulley 41a. A cleaner 41b, an electric charger 41c, the individual developers 41d for the toner colors, Y, M, C, and K, and a transfer device 41e are arranged in the proximity of the belt. A transfer unit 42 is provided in a position opposite to this transfer device 41e, which takes up the paper transported from the paper tray 35 via the paper transport channel 35a and transfers the toners by its rotation in four turns onto the paper in the order of Y, M, C, and K, in the case of full color copying in four colors. The paper with the images in the toners so transferred is transported from the transfer unit 42 via a vacuum transport unit 43 to the fixing unit 45, in which the paper is processed for fixing the images on it, and then the processed paper is discharged from the copying machine. Moreover, the machine is so constructed that paper is fed selectively also from the single sheet inserter (SSI) 35b into the paper transport channel 35a.

The U/I 36 is to be operated by the user to select the desired functions and to give instructions on the conditions for the execution of the selected functions, and the U/I 36 is provided with a color display unit 51 and a hard control panel 52, which is set on one side of the said display unit, and is so designed that the user can give instructions directly by operation of the soft buttons on the screen in combination with the infrared ray touch board 53.

A description will next be given of the optional items which are available for use in addition to the base machine. One of the optional items is an editing pad, a coordinate input device, which can be placed on the platen glass 31 and used for editing various kinds of images with an input pen or with a memory card. Moreover, the copying machine is designed to accept the installation of the existing ADF 62 and sorter 63.

Furthermore, a characteristic of this example of preferred embodiments is that the color copying machine according to the present invention is capable of producing a color copy directly from color film by projecting the film image onto the platen glass 31 by the light projected from the F/P 64 and reading the projected optical image for each of the colors, R, G, and B by means of the reading sensor 37 via the scanning optical mechanism mentioned above. The types of film which can thus be copied are negative film, reversal film, and so forth.

Figure 14:
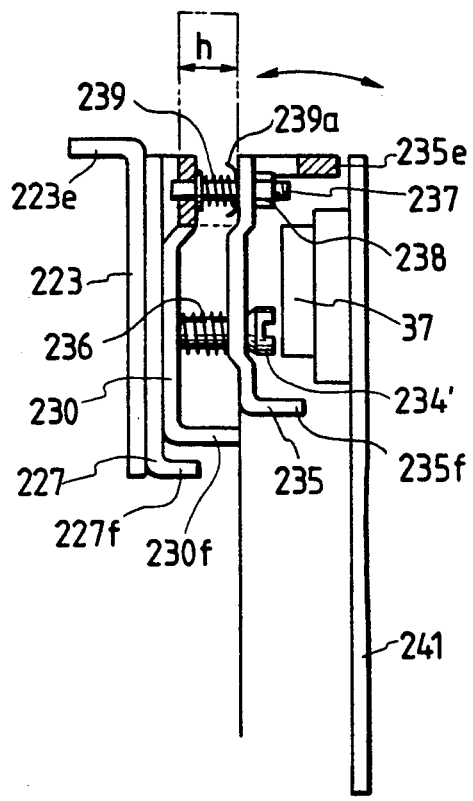
FIG. 14 illustrates the adjustment of the reading sensor in the tilting direction.

FIG. 1 is a schematic drawing illustrating the overall construction of the image input terminal (IIT) 32 of the color copying machine in the first example of the preferred embodiments of the present invention. As shown in FIG. 14 (a), the IIT 32 is comprised of an optical scanning mechanism and a reading sensor 37, as mentioned above.

The optical scanning mechanism is composed of a fluorescent lamp 201, which irradiates the original sheet, a full rate mirror (FRM) 202, and a pair of half rate mirrors (HRM) 203, 204, and an optical lens 205, which forms images on the reading sensor 37. The FRM 202 is set at an inclination of approximately 45° and is installed on the first carriage 207 in such a manner that its reflecting surface is directed toward the upper left area in the Figure. In the same way, the fluorescent lamp 201 is installed on the first carriage 207. Moreover, the first carriage 207 is designed to move along the subsidiary scanning direction of the color copying machine. This arrangement enables the copying machine to perform its scanning operations for reading the original sheet placed on the platen glass 31.

Moreover, the pair of HRM 203 and 204 are installed on the second carriage 209 with a slant of approximately 45° and also in such a manner that one is located above the other. In this case, the upper HRM 203 is set with its reflecting surface directed towards the lower right direction in the Figure while the lower HRM 204 is set with its reflecting surface directed towards the upper right direction in the Figure. With the individual mirrors 202, 203, and 204 thus arranged, the optically read images of the original sheet placed on the platen glass 31 are led into the optical lens 205.

Also the second carriage 209 is so designed that it can move in the subsidiary scanning direction, and the traveling speed $v_1$ of the first carriage 207 is two times as high as the traveling speed $v_2$ of the second carriage 209. Thus, if the ratio of the traveling speed of the first carriage 207 and the second carriage 209 is set at 2, the traveling distance of the FRM 202 will always be two times as long as the traveling distance of the HRM 203 and HRM 204. Therefore, to whatever positions the individual mirrors 202, 203, and 204 may move, the length of the light path from the original sheet to the optical lens 205 will always remain constant (for example, approximately 500 mm in the example shown in FIG. 1 (b) (In other words, the distance from any image on the original sheet to the optical lens 205 will be equal)).

Figure 2:
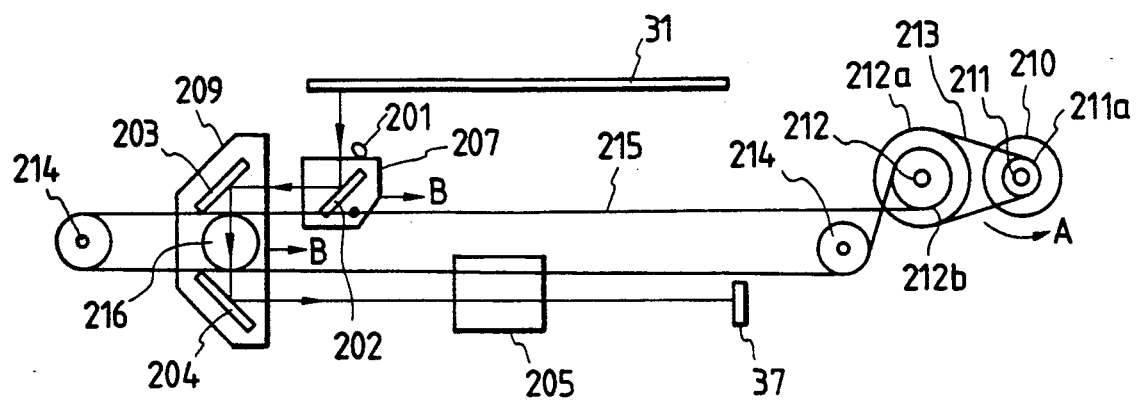
FIG. 2 is a chart illustrating the driving means in the original sheet scanning mechanism.

As shown in FIG. 2, the first carriage 207 and the second carriage 209 are driven with a carriage motor 210, which is composed of a DC servo motor or a pulse motor, for example. Specifically, a transmission shaft 212 is provided in parallel with the output shaft 211 of the carriage motor 210, and a timing belt 213 is suspended between the timing pulley 211a fixed on the output shaft 211 and the timing pulley 212a fixed on the transmission shaft 212. Also, a capstan pulley 212b is fixed on the transmission shaft 212, and, between this pulley 212b and the driven rollers 214 and 214, which are arranged in their positions opposite to this pulley 212b, a wire cable 215 is suspended in a crossing pattern. This wire cable 215 is connected with the first carriage 207 and is also wound by at least several turns around the speed reducing pulley 216, which is installed on the second carriage 209 in such a manner as to permit the free rotating motion of the pulley. Consequently, when the carriage motor 210 is rotated in the direction indicated by arrow A, the first carriage 207 moves in the direction indicated by the arrow mark B at the same speed $v_1$ as the wire 215 and, at the same time, the second carriage 209 moves at the speed $v_1/2$ in the same direction.

In the meantime, the light from the fluorescent lamp 201 is irradiated and reflected on the original sheet placed on the platen glass 31, and the reflected light is further reflected on the FRM 202, the HRM 203 and 204, and is thereafter formed into images on the three-color linear sequential sensor 231 by the optical lens 205a for the platen. In order to obtain a full color copy, it is necessary for the FRM 202 and the HRM 203 and 204 to repeat the scanning operation four times.

As illustrated in FIG. 1 (d), the CCD line sensor 37 is formed into a three-line sensor (i.e. the three-color linear sequential sensor) 217, which is provided with the lines of picture elements 217a, 217b, and 217c provided with color filters having spectral sensitivity for red (R), green (G), and blue (B) and arranged at upper and lower levels. At present, this three-line sensor 217 is realized in the form of a sensor wherein the size of one picture element is 11 [micro]m, the number of picture elements in each picture element line totals 5,000, and the interval between the picture element lines is 154 [micron]m. The size of the optical system for reading an original sheet in the standard A3 form with its shorter side (297 mm) set at the top is as shown in FIGS. 1 (b) and (c), and the size of the three line sensor 231 is as shown in FIG. 1 (d). The magnification m in this optical system is expressed by the following equation:

$$m = 11/62.5 :=$$

Therefore, the picture element line interval 154 [micron]m on the side of the reading sensor 27 corresponds to 875 [micro]m on the original sheet side. Moreover, the focal distance f of the optical lens 205 as used in this case is 75 mm.

Figure 3A:
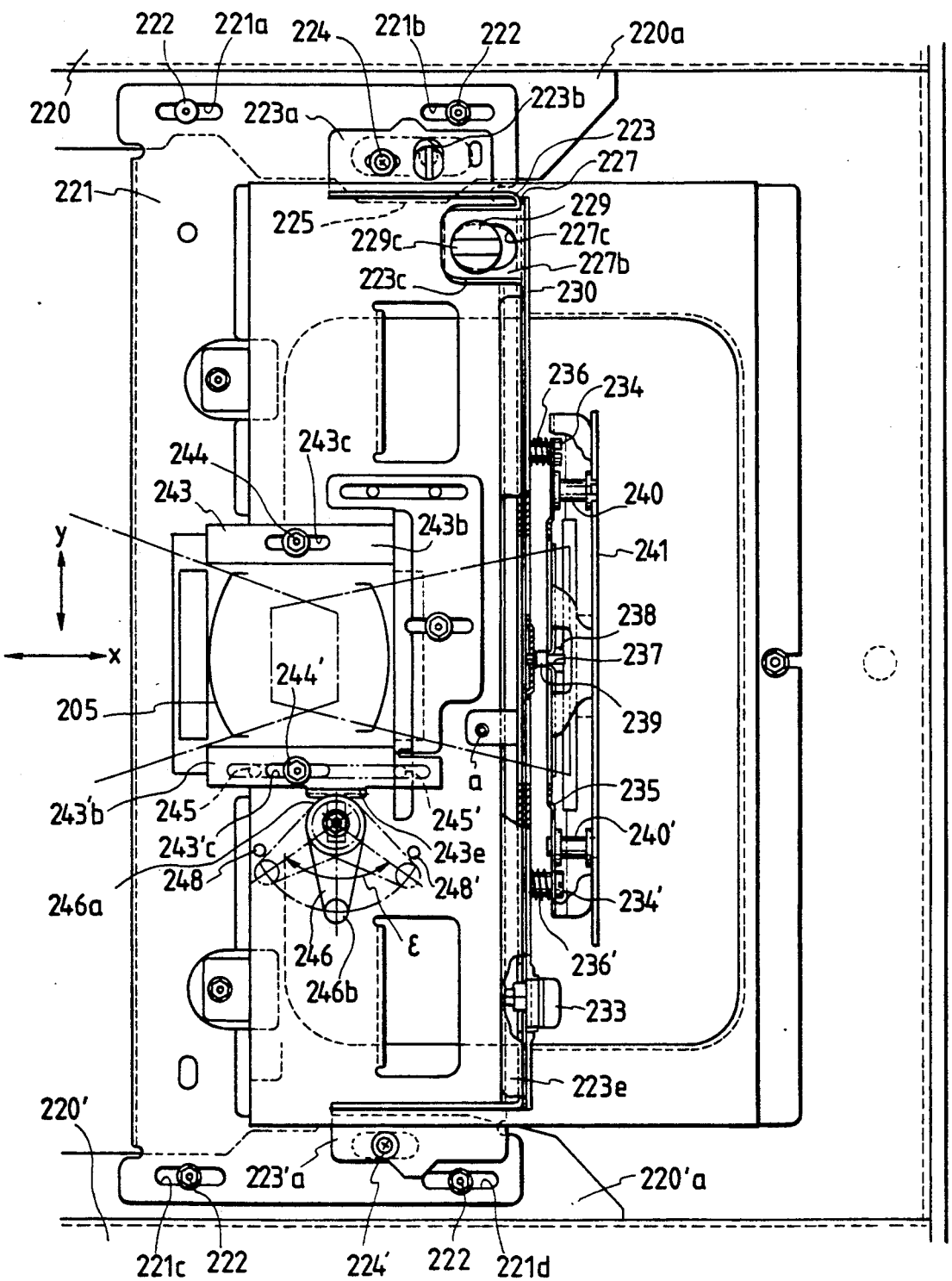
FIGS. 3a-3b illustrate the installation of the reading sensor and the optical lens.
Figure 3B:
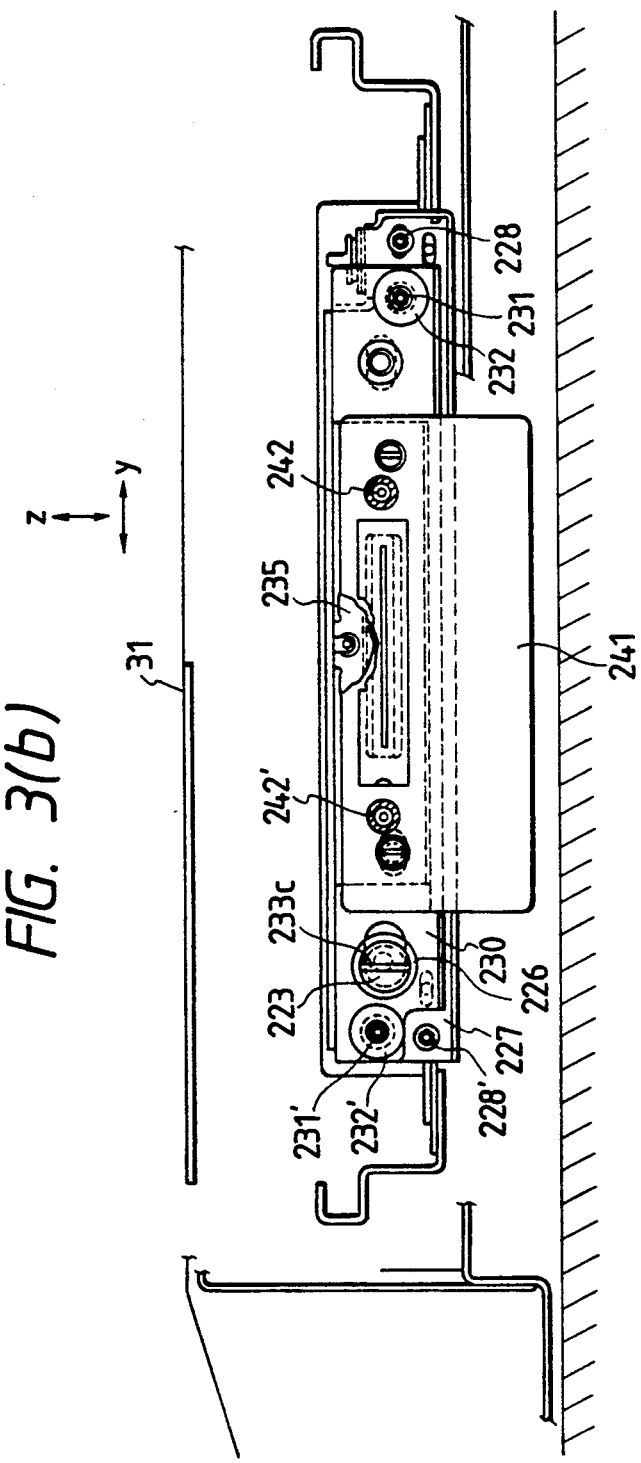

Next, a description will be given of the installation of the reading sensor 37. FIG. 3 illustrates the reading sensor 37 as assembled into the main unit 30 of the color copying machine.

Figure 4:
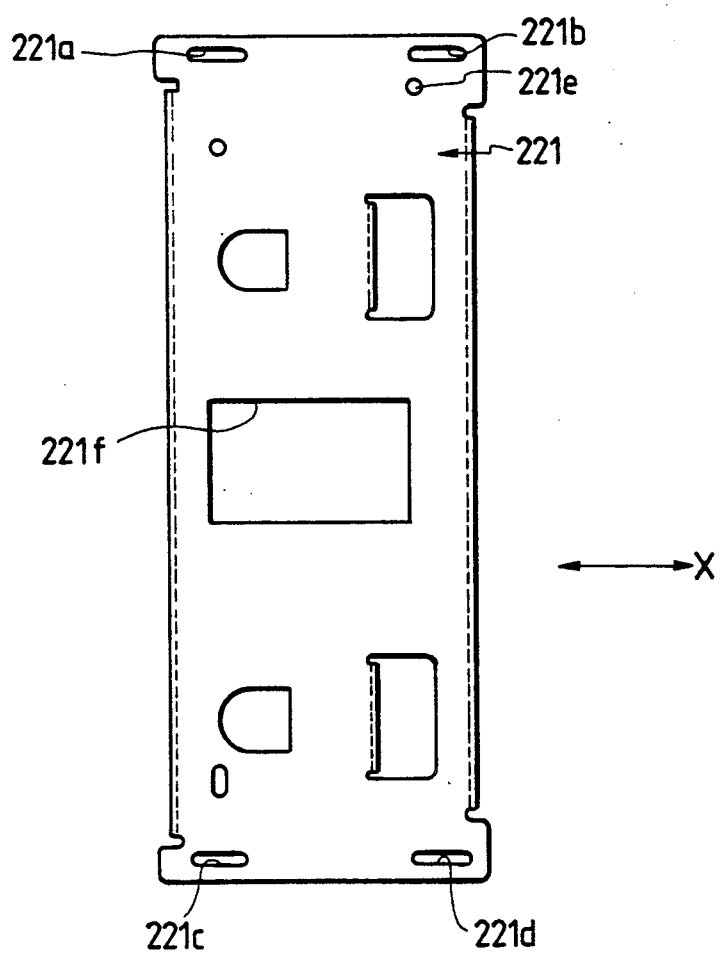
FIG. 4 is a plane view of the base plate, which is one of the component elements of the position adjusting apparatus.

As shown in FIG. 3 (a), a pair of frames 220 and 220' extending in parallel in the subsidiary scanning direction of the main unit of the copying machine are provided with a pair of flanges 220a and 220'a in such a manner as to protrude towards the inside area, and a base plate 221 is suspended between this pair of flanges 220a and 220'a. As shown in FIG. 4, two pairs of mounting holes 221a, 221b, 221c, and 221d in oblong shape extending in the subsidiary scanning direction (i.e. in the direction of the x-axis) are made through the two end parts of the base plate 221, and the base plate 221 is fixed on the flanges 220a and 220'a by joining the said plate to the flanges 220a and 220'a with the screws 222 put through these holes 221a through 221d. Accordingly, when the screws 222 are put into their loosened state, the base plate 221 can be moved for an adjustment of its position by the length of the holes 221a through 221d in the x-axis direction.

Figure 5:
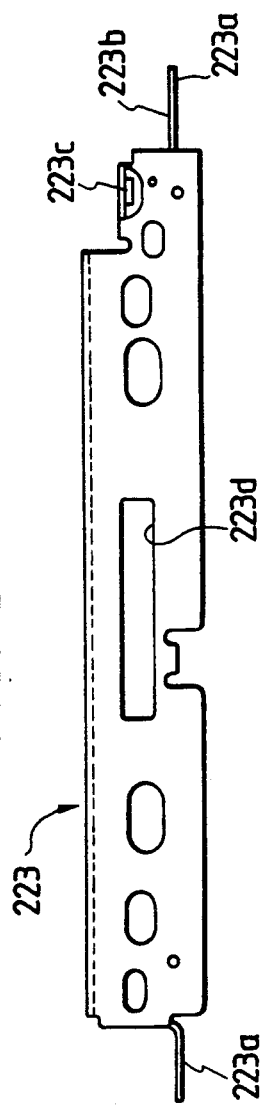
FIG. 5 illustrates the first plate, which is another component of the position adjusting apparatus.
Figure 6A:
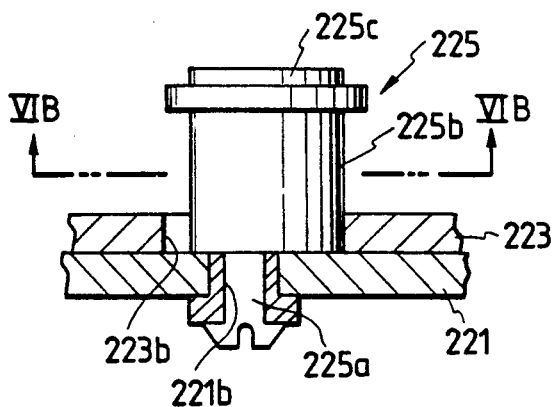
FIGS. 6a-6b illustrate the eccentric cam.
Figure 6B:
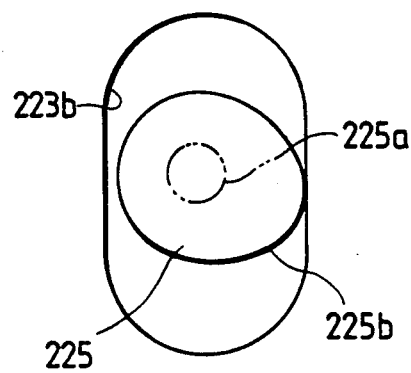
Figure 7A:
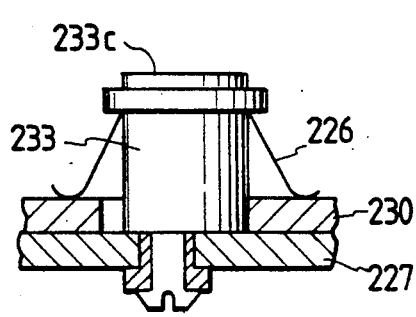
FIGS. 7a-7d illustrate the plate spring.
Figure 7C:
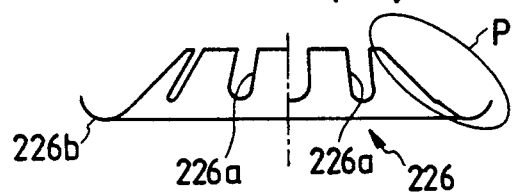
Figure 7D:
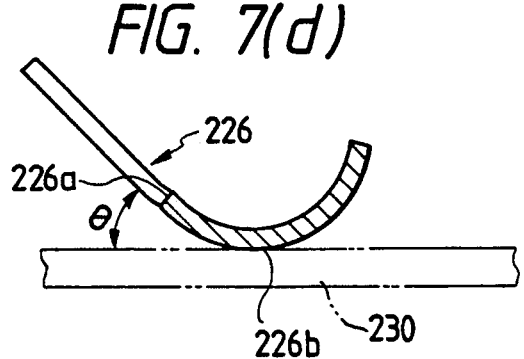
Figure 7B:
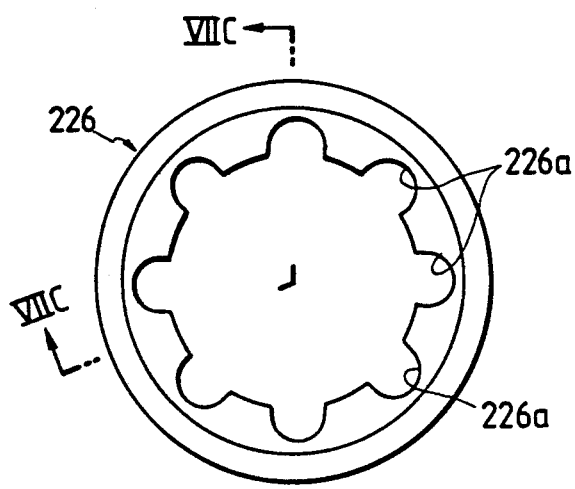
Figure 8:
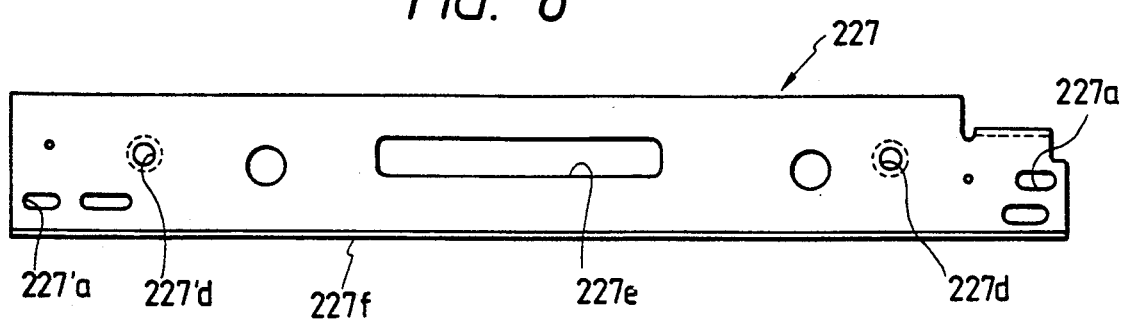
FIG. 8 and FIG. 9 respectively illustrate the second plate and the third plate, which are elements of the position adjusting apparatus.

On the right end part of this base plate 221 is arranged the first plate 223, which extends in the main scanning direction, and the pair of flanges 223a and 223a formed in both ends of this first plate 223 (as explicitly shown in FIG. 5) are installed on the base plate 221 with a pair of screws 224 and 224. Also an adjusting hole in an oblong shape extending in the main scanning direction (i.e. the y-axis direction) is made through one flange 223a of the first plate 223, and an eccentric cam 225 is provided to penetrate through this adjusting hole 223b. As illustrated in FIG. 6 (a), the rotating shaft 225a of this cam 225 is supported in the hole 221e of the base plate 221 in such a manner as to permit its free rotating motion and, at the same time, a part of the cam surface 225b of the said cam 225 is set in direct contact with the hole wall of the adjusting hole 223b, as shown in FIG. 6 (b). Also, a knob 225c for rotating the cam 225 is provided on the upper end of the eccentric cam 225. Moreover, the first plate 223 is supported at approximately its central supporting part by the base plate 221 in such a manner as to permit the free rotating motion of the first plate. Therefore, with the eccentric cam 225 turned by a grip on the knob 225c, the first plate 223 is moved in rotation centering around its supporting part a by such an angle as corresponds to the amount of rotation of the cam surface 225b. In such a case, the penetrating hole 223c for the screw 224 in the flange 223a on the side where this eccentric cam is set is formed in an oblong shape, so that it allows the rotating motion of the first plate 223. It is appropriate to set the contour curve of the eccentric cam 225 in such a way as to be suitable for the amount of the rotating motion of the first plate 223.

On this first plate 223 is fixed the second plate 227. As shown in FIG. 3 (b), the fixing of the second plate is achieved by joining it with the first plate 223 with screws. The screws 228 and 228' with a spring washer set with each are passed through the holes made in the second plate 227. In such a case, the pair of holes through which the screws 228 and 228' are driven are made in the form of oblong holes 227a and 227'a extending in the main scanning direction (i.e. the y- axis direction). Moreover, a flange 227b extending in the subsidiary scanning direction is formed on the upper rim on one end of the second plate 227 as shown in FIG. 3 (b), and an adjusting hole 227c in oblong shape extending in the subsidiary scanning direction is made in this flange 227b. The eccentric cam 229 is installed through this adjusting hole 227c. The rotating shaft of this eccentric cam 29 is supported in such a manner as to permit its free rotation on the flange 223a formed on the first plate 223 and extending in the subsidiary scanning direction, and the cam is set in such a way that its surface is put into direct contact with the hole wall of the adjusting hole 227c. This eccentric cam 229 is approximately identical to the eccentric cam 225 shown in FIG. 6 (although the shape of the cam surface is different). Hence, a description of this eccentric cam is omitted.

Thus, the second plate 227 shifts its position in the main scanning direction (i.e. in the y-axis direction) by such an amount as corresponds to the amount of rotation of the cam surface when the eccentric cam 229 is rotated by knob 229c. In such a case, the movement of the second plate 227 in the y-axis direction is permitted by the oblong hole 227a.

Figure 9:
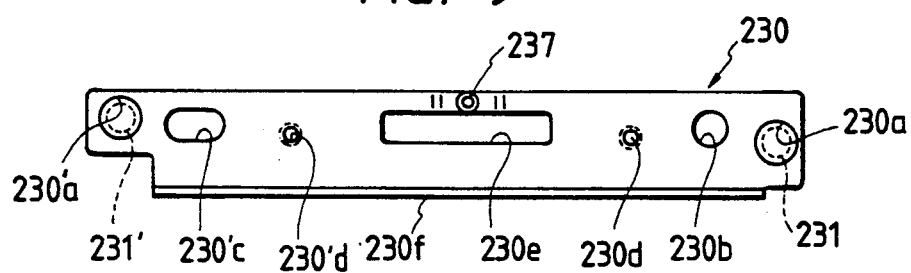

Furthermore, the third plate 230 is fixed on the second plate 227. As shown in FIG. 3 (b), the fixing of the third plate is accomplished by passing a pair of screws 231 and 231' through a pair of circular holes (230a and 230'a in the reference numbers in FIG. 9) made in such positions on the third plate 230 as correspond to these screws 231 and 231' and thereafter joining the third plate to the second plate by means of the said screws. In that case, the space between the pair of holes 230a and 230'a and the screws 231 and 231' is set in such a manner that a gap in the prescribed size is formed therein, as shown in FIG. 9. As mentioned later, the screws 231 and 231' for securing the second plate 227 do not change their positions even if the third plate 230 moves by the rotating motion of the eccentric cam 233. Therefore, this gap will be necessary in order to allow for the said movement of the third plate 230. In such a case, it is necessary to set this gap in a length not less than 4 mm, provided that the eccentricity is +/−2 mm. Accordingly, when it is assumed that the thread diameter of the screws 231 and 231' is M3, for example, the diameter of the gap should be not less than 7 mm (3+4=7). For this reason, the diameter of the gap will be nearly equal to the diameter of the head of the screws 231 and 231' (M3), so that it becomes impossible to achieve any sufficient fixing of the third plate. In this example of the preferred embodiments, therefore, flat plates 232 and 232' are arranged between the heads of the screws 231 and 231' and the third plate 230 as shown in FIG. 3 (b), so that the said plate can be tightened in a stable state however the eccentric cam 233 may be turned.

Also, as shown in the same FIG. 3 (b), a circular adjusting hole 230b and an adjusting hole 230c in oblong shape extending in the main scanning direction are made in the third plate 230, and a pair of eccentric cams in an identical shape (the eccentric cam at the side of the circular hole 230b is not shown in the Figure) are provided to penetrate through these adjusting holes 230b and 230c. The rotating shaft of this eccentric cam 233 is supported in the holes 227d and 227'd in the second plate 227, in such a manner that its free rotation is permitted and also so that the cam surfaces are brought into direct contact with the hole walls in the adjusting holes 230b and 230c. This eccentric cam 233, too, is almost identical to the eccentric cam 225 shown in FIG. 6 (though the shape of the cam surface is different), and its description is, therefore, omitted.

Furthermore, as shown in FIG. 3 (b) and FIG. 7 (a), a plate spring 226 is arranged between the pair of eccentric cams 233 and the third plate 230. As shown in FIGS. 7 (b) through (d), this plate spring 226 is formed into a cylinder in a conical shape with a chopped head, and many concave parts 226a and 226a are formed on the upper end edge of the said plate spring 226, so that the head assumes a flower-like shape. With this flower-like shape, the plate spring 226 is made so as to be ready for elastic deformation. Also, as shown in FIGS. 3 (c) and (d), the lower end edge of the plate spring 226 is formed into a curved part 226b, so that the lower end edge of the plate spring 226 will move smoothly on the third plate 230 when the plate spring 226 undergoes elastic deformation in the upward and downward direction. Then, as shown in FIG. 3 (d), the cut concave part 226a is formed to a point not yet reaching the curved part 226b. This is intended for preventing the obstruction of the smooth movement of the curved part 226b while it moves on the third plate 230 by the square edge which would be formed on the curved part 226b if the cut concave part 226a were extended as far as the curved part 226b. Moreover, for facilitating the elastic deformation of the plate spring 226, it is desirable to set a relatively small angle [theta] for the chopped head conical form.

This plate spring 226 is used to prevent the wavering of the pair of eccentric cams even if they are installed on a side of a perpendicular surface. It is intended thereby to prevent the influence otherwise exerted on the depth of the reading sensor 37 by the deviation which occurs in the position of the reading sensor 37 after its adjustment.

Moreover, in order to facilitate the elastic deformation of the plate spring 226, it is also conceivable to form a dividing groove extending in the axial direction from the upper end edge to the lower end edge of the said plate spring.

Thus, the third plate 230 moves in the main scanning direction (i.e. the y-axis direction) and in the upward and downward direction (i.e. the z-axis direction crossing at right angles with the paper surface) by the amount corresponding to the amount of rotating motion of each cam surface and also rotates round the optical axis (i.e. the x-axis), when the eccentric cam 233 is rotated by knob 233c.

Figure 10:
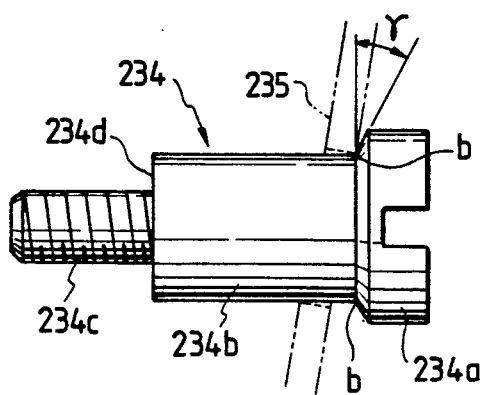
FIG. 10 illustrates the stud bolt.

As shown in FIG. 3 (a), the third plate 230 is provided with a pair of stud bolts 234 and 234' set therein. As shown in FIG. 10, each of these stud bolts is composed of the head 234a, the main body 234b, and the screw 234c. The screw 234c on the stud bold is helically fit into a pair of female screws 230d and 230'd in the third plate 230 as shown in FIG. 9. In such a case, it is desirable to prevent the stud bolt 234 from leaning. This may be accomplished by forming in a large size that surface of the end part 234d of the main body which comes into direct contact with the third plate 230.

Figure 11A:
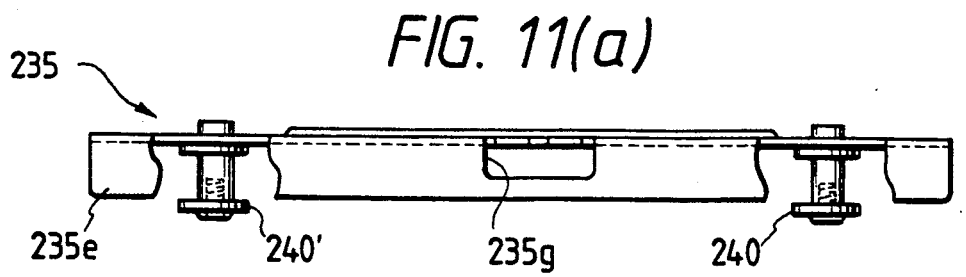
FIGS. 11a-11b illustrate the mounting bracket.
Figure 11B:
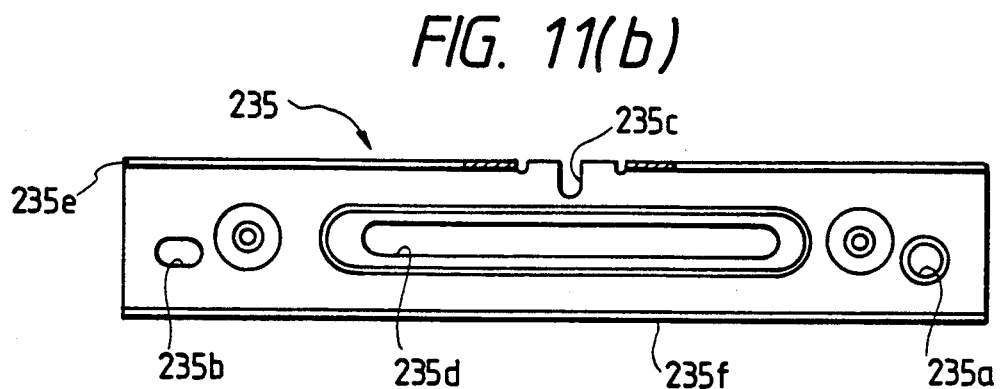
Figure 12:
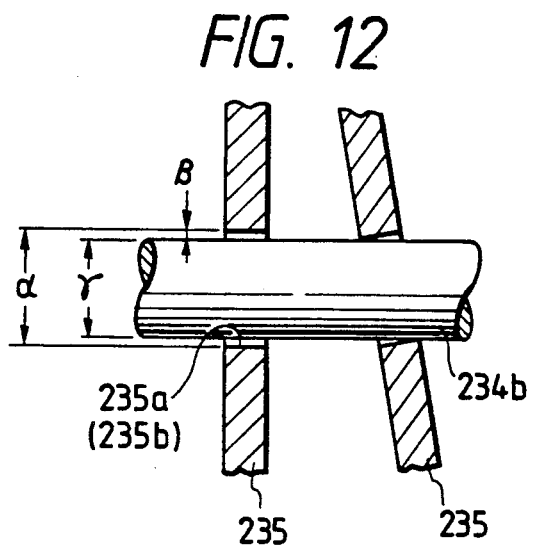
FIG. 12 illustrates the rotating motion of the mounting bracket from the effect of the tolerance in the fitting of the mounting bracket and the stud bolt.

The mounting bracket 235 is set in free fit with the main body 234b of these stud bolts 234 and 234' via a pair of through holes. As shown in FIG. 11, this pair of through holes consist of one hole formed into a circular hole 235a and the other hole formed into an oblong hole 235b. As illustrated in FIG. 12, the size [alpha] of these holes (the size representing the diameter in the case of the circular hole 235a and the width in the case of the oblong hole 235b) and the diameter r of the main body 234b of the stud bolt are set in the prescribed fitting tolerance (for example, [alpha] is set at 6H9 in diameter while r is set at 6H8 in diameter), so that the prescribed gap [beta] is formed between these. Owing to this gap [beta], the mounting bracket 235 can lean by the prescribed amount as shown in FIG. 12. In that case, the end edge of the head 234a on the side of the main body 234b is cut off by an angle of inclination [gamma] larger than the angle of inclination of the mounting bracket 235, as shown in FIG. 12, so that the said mounting bracket may lean by the said prescribed amount. Also, the mounting bracket 235 rotates with the point b as the center of its motion, and the mounting bracket 235 will have an extremely slight deviation in position by the effect of the R of the point B. For this reason, it is necessary to set the R for the point b at as small a value as possible. In this manner, the mounting bracket 235 is installed with a pair of stud bolts 234. Also, the rightward movement of the mounting bracket 235 is regulated by the head 234a of the stud bolt 234. Moreover, as shown in FIG. 14, a compression coil spring 236 is set between the third plate 230 and the mounting bracket 235, and, by this coil spring 236, the mounting bracket 235 is constantly thrust onto the head 234a. That is to say, the mounting bracket 235 is held between the coil spring 236 and the head 234a. In such a case, the gap between the third plate 230 and the mounting bracket 235 is set by the reference block with the set thickness h as indicated by the two-dot chain line, and the pair of stud bolts 234 are tightened in such a way that this gap is realized. Then, with the force applied by the coil spring 236, the mounting bracket 235 accurately attains its reference plane.

Figure 13:
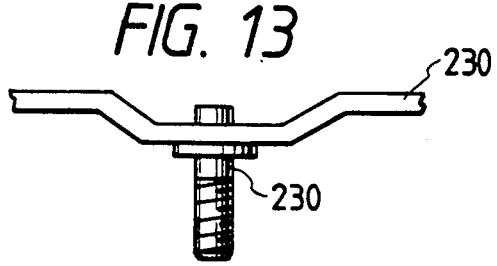
FIG. 13 illustrates the fixing of the screw for putting the mounting bracket into its rotating motion.

Furthermore, the screw 237 is fixed on the third plate 230 so as to position the said screw in the center between the pair of stud bolts 234 and 234' and also in a position above these stud bolts 234 and 234', as illustrated in FIG. 3 (b), FIG. 13 and FIG. 14, and this screw 237 extends through the notch 235c formed in the position corresponding to that of the mounting bracket 235. On the top of the screw 237, a nut 238 is helically fit, and the rightward movement of the part of the mounting bracket 235 in the proximity of the notch 235c is regulated with this nut 238. Then, the part of the mounting bracket 235 in the proximity of the notch receives force constantly thrusting it rightward, as shown in FIG. 3 (a) and in FIG. 14, with the compression coil spring 239 set in the screw 237 in the position between the third plate 230 and the mounting bracket 235. Therefore, the mounting bracket 235 will rotate in a pattern of movement centering around a straight line connecting the points b on the pair of stud bolts 234 and 234' when the part of the mounting bracket 235 is in the proximity of the notch and the nut 238 with a is turned by a tool such as a spanner. That is to say, the mounting bracket 235 will rotate round the y-axis by the amount regulated by the fitting tolerance mentioned above. In that case, the part of the mounting bracket 235 in the proximity of the notch can shift smoothly since the coil spring 239 is supported by the retainer 239a.

On this mounting bracket 235, a pair of stud bolts 240 and 240' are fixed, and a board 241 on which the reading sensor 37 is fixed to form one unified structure with it is fixed is mounted with a pair of screws 242 and 242'.

In the first plate through the third plates 223, 227, and 230 and the mounting bracket 235, holes 223d, 227e, 230e, and 235d for the passage of the optical images from the optical lens 205 are made respectively in approximately the same position and in an almost identical size. Also, flanges 223e, 227f, 230f, 235e, and 235f are formed respectively on the upper end edge, on the lower end edge, or on the edges on both ends in the first plate through the third plates 223, 227, and 230 and the mounting bracket 235. The rigidity of the individual plates and the bracket is strengthened by these flanges. Moreover, the flange 235e on the upper end edge of the mounting bracket 235 extends to cover the space between the mounting bracket 235 and the board 241, thereby preventing the intrusion of external disturbing light and dust or the like into the area around the reading sensor 37. In the center of flange 235e, a hole 235g is made for inserting a tool to turn nut 238.

The optical lens 205 is mounted with a holding casing 243 in the center of the base plate 221. This holding casing 243 is comprised of a lens housing section 243a, which accommodates and holds the optical lens 205, and a pair of flanges 243b and 243'b, which extend from this lens housing section 243a. The lens housing section 243a is constructed with its upper part and its lower part formed in flat surfaces, and also the optical lens consequently has its upper and lower surfaces similarly formed in a flat shape. Thus, the protrusion of the optical lens 205 into the upper region is prevented by making its upper and lower surfaces flat. With this formation, it becomes possible to avoid interference between the FRM 202 and the optical lens 205 in the course of the scanning operation even if the diameter of the lens is large as in the case of a lens for a color copying process. Moreover, the construction of the optical lens 205 thus held on the base plate 221 by way of the holding casing 243 makes it possible to mount the lens in a well-stabilized state without slanting and consequently to maintain the performance features of the lens, such as resolution, at a high level. Also, relatively long holes in an oblong shape, 243c and 243'c, which extend in the direction of the optical axis of the lens 205 (i.e. in the x-axis direction) are respectively made in the flange 243b. Through these holes 243c and 243'c, a pair of screws 244 and 244' are helically joined to the base plate 221, thereby fixing the holding casing 243 on the base plate 221.

Figure 15:
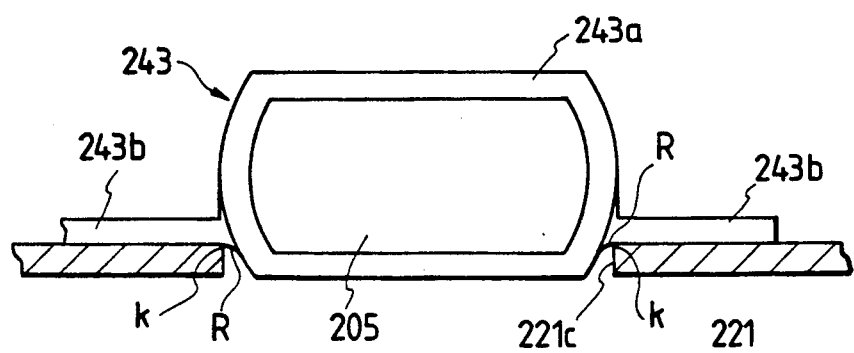
FIG. 15 illustrates an example of the support of the optical lens.

However, since it is necessary to mount the lens 205 in a precise position in the direction of its optical axis, it is necessary to make adjustments of the position and to provide stable holding. In this regard, the first conceivable step is to employ a method whereby the lower end part of the holding casing 243 is set in the mounting hole 221f of the base plate 221, as shown in FIG. 15. Thus the lower areas of the flanges 243b and 243'b of the holding casing 243 are supported on the base plate 221, and the boundary region between the exterior wall of the housing section 243a in the holding casing 243 and the lower surface of the flange 243b will be held at the square part k of the interior wall of the mounting hole 221f in the base plate 221, thereby guiding the holding casing 243 with the interior wall of the mounting hole 221f to move the said casing 243 in the direction of the optical axis. However, as a rounded part is formed in the above-mentioned boundary region as the result of the manufacturing process, it is extremely difficult to support the holding casing 243 on the surfaces on the flanges 243b and 243'b and to provide the support in the boundary region. Therefore, this example of the preferred embodiment employs the method described below.

Specifically, as shown in FIGS. 3 (a) and (b), a relatively long groove 243d extending in the direction of the optical axis of the lens 205 is formed in the lower surface of the other flange 243'b of the holding casing 243. The center of this groove in its longitudinal direction is in agreement with the center of the above-mentioned hole in its longitudinal direction, and also their widths are equal to each other. In this groove 243d are inserted the heads of a pair of stud bolts 245 and 245', which are set upright at the prescribed intervals in the direction of the optical axis on the base plate 221. With this pair of stud bolts 245 and 245' and the groove 243d, the holding casing 243 is guided with a high degree of precision in the direction of the optical axis and is also held on its surface by the flange 243b.

In the holding casing 243, a rack 243e of a prescribed length is formed on the edge of the flange 243b positioned on the side where the groove 243d is formed. In the meantime, an operating lever, which is provided at one end thereof with a pinion to mesh with this rack 243e, is installed in such a manner as to permit its free rotating motion on the base plate 221, and a knob 246b is provided on the other end of this operating lever 246. In such a case, it is desirable to set a small value for the module M of each tooth from the viewpoint of achieving a reduction of the influence of the backlash. The use of this rack and pinion mechanism makes it possible to move the holding casing 243 at a reduced speed, and consequently it becomes possible to make fine adjustments in an easy and simple manner. Moreover, as shown in FIG. 3 (c), the operating lever 246 is constantly pushed by the plate spring 247 onto the base plate 221, so that the said operating lever is prevented from wavering. Furthermore, the operating lever 246 has its rotating angle [eta] regulated within the prescribed range by a pair of stoppers 248 and 248' set up on the base plate 221. Thus, the operating lever 246 is prevented from protruding either outside the casing to distract from the external appearance or also into the optical path.

In the construction as just described, the holding casing 243 is moved in the direction of the optical axis via the rack and pinion mechanism in an amount proportionate to the rotating angle [gamma] of the operating lever when the operating lever 246 is rotated by knob 246b. Because of the effect of the guiding of the holding casing 243 by means of this pair of stud bolts 245 and the reduction of speed with the rack and pinion mechanism, improved precision is achieved for the adjustment of the position of the lens 205 in the direction of its optical axis.

Figure 16:
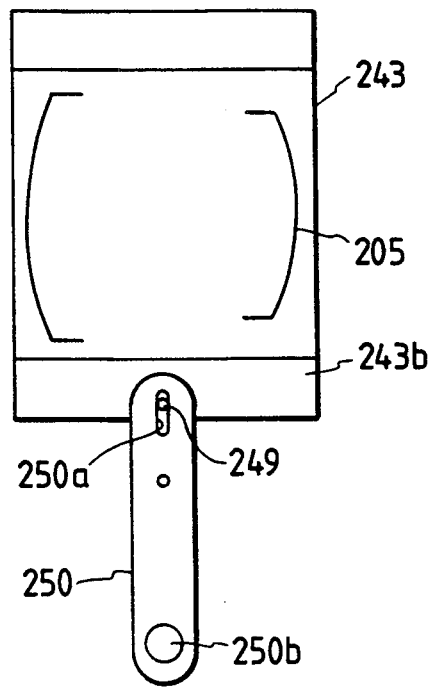
FIG. 16 illustrates another example for the movement of the optical lens in the direction of its optical axis for its adjustment.
Figure 17:
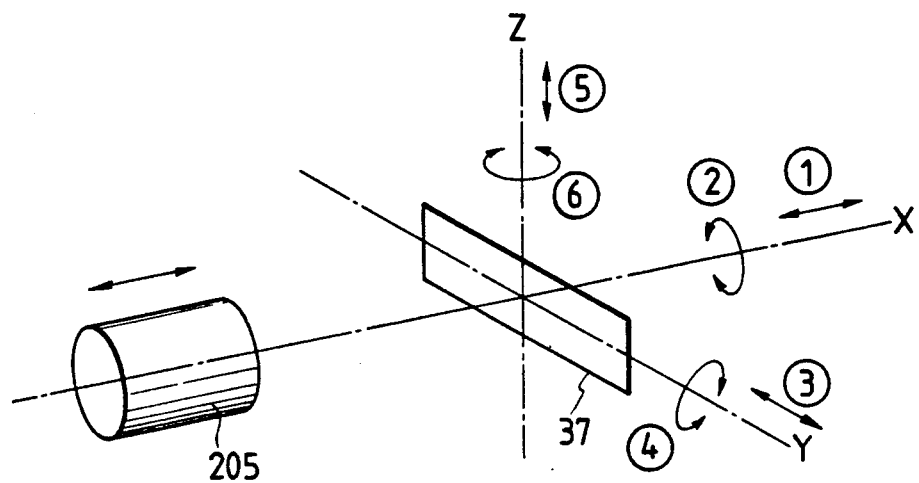
FIG. 17 illustrates the adjustment of the position of the reading sensor in six directions.

Moreover, another mechanism as is shown in FIG. 16 is conceivable as a means of adjusting the position of the optical lens 205, in addition to the rack and pinion mechanism described above. A pin 249 is set on the flange 243b of the holding casing 243 and an operating lever 250 with an oblong hole 250a, through which this pin 249 passes, and with a knob 250b provided on the other end thereof is held on the base plate 221 in such a manner as to permit the free rotating motion of the lever. Then, by rotating the operating lever 250, the holding casing 243 is moved in the direction of the optical axis. This mechanism, which is formed by setting up pin 249 and also making the oblong hole 250a, has a simple construction. Yet the length of the arm must inevitably be extended in order to attain the prescribed speed reduction ratio, and this presents the problem that the mechanism requires a large space for its installation.

Next, a description will be given of the method and procedure for the adjustment of the position of the reading sensor 37.

The adjustment of the position of the reading sensor 37 requires adjustments in six directions, namely, (1) in the direction of the x-axis (i.e. in the subsidiary scanning direction, namely, in the direction of the optical axis), (2) in the rotating direction round the x-axis, (3) in the direction of the y-axis (i.e. in the main scanning direction), (4) in the rotating direction round the y-axis (i.e. in the tilting direction), (5) in the z-axis direction (i.e. in the upward and downward direction), and (6) in the direction of rotation round the z-axis. The adjustments of the position of the reading sensor 37 are so delicate that the adjusting work is done by the following procedure using an oscilloscope.

(1) The adjustment under (1) above (i.e. the adjustment in the x-axis direction)

With the two screws 244 and 244' set in their loosened state, the operating lever 246 is rotated and the holding casing 243 is moved in the direction of the x-axis at a speed reduced by means of the rack and pinion mechanism 246a and 243e. By this operation, the holding casing 243 is adjusted in the x-axis direction, by which the lens 205 is brought into its proper focus, so that the reading sensor 37 can read the images. After the adjustment, the screws 244 and 244' are tightened, and the holding casing 243 is thereby fixed on the base plate 221.

The four screws 222 are loosened, the base plate 221 is moved in the direction of the x-axis, and both the lens 205 and the reading sensor 37 are moved in the direction of the x-axis, their positions in the x-axis direction being thereby adjusted. In other words, the conjugated length of the lens is thereby established. After this adjustment, the base plate 221 is fixed on the flange 220a of the frame 220 by tightening the screws 222.

(2) The adjustment under (6) above (i.e. the adjustment for rotation round the z-axis)

Next, with the screws 224 and 224' being loosened, the eccentric cam 225 is operated to rotate the first plate 223 round the point a, and an adjustment is thereby made of the position of the movement in relation to the z-axis. After the adjustment, the screws 224 and 224' are tightened, by which the first plate 223 is fixed on the base plate 221.

(2') The adjustment under (4) above (i.e. the adjustment for rotation round the y-axis; the adjustment in the tilting direction)

With the rotation of the nut 238, reading sensor 37 is adjusted in the tilting direction by rotating the mounting bracket 235 round the y-axis by the use of the tolerance for fitting the stud bolt 234 and the mounting bracket 235 into the holes 235a and 235b. This adjustment mentioned under (4) above is to be made only in the case of a color copying machine. In the case of a black and white copying machine, moreover, this adjustment may be utilized as the final fine adjustment of the conjugated length for the lens. In such a case, the mounting bracket 235 is held in the position as adjusted by the force of the springs 236 and 239.

Moreover, either one of the adjustments described in (2) and the adjustment described in (2') above may be made before the other.

(3) The adjustments under (2) and (5) above (i.e. the adjustment of the rotation round the x-axis (i.e. the optical axis) and the adjustment in the z-axis direction)

Next, with the screws 231 and 231' loosened, adjustments are made of the position of the reading sensor in the z-axis direction and its rotation round the x-axis (i.e. the optical axis) by moving the third plate 230 in the upward and downward directions and in its rotating motion round the x-axis with the operation of the pair of the eccentric cams 233 at the same time by both the left and right hands. After these adjustments are finished, the screws 231 and 231' are tightened, and the third plate 230 is thereby fixed.

Moreover, the adjustments described in (2) and (2') and those described in (3) may be made in the reverse of the order given here.

(4) The adjustment mentioned under (3) above (i.e. the adjustment in the y-axis direction)

Finally, with the screws 228 and 228' loosened, adjustment is made of the reading sensor 37 in the main scanning direction by moving the second plate 27 in the direction of the y-axis with the operation of the eccentric cam 229. After the adjustment is made, the screws 228 and 228' are tightened, and the second plate 227 is fixed on the first plate 223.

In this regard, the adjustment described in (2') may be may made after the completion of the adjustments mentioned in (3) and (4).

The control process for the carriage motor 210 will now be described with respect to the case in which a stepping motor is used as the motor 210.

For the stepping motor 210, the motor winding is connected in a pentagonal form, and its connecting points are connected to the positive side or the negative side of the power source by way of two transistors respectively. The motor is operated by bi-polar driving with ten switching transistors. Also, the motor is driven with control performed in such a way as to maintain the electric current fed to the motor at a constant rate by feeding back the value of the current flowing into the motor.

FIG. 18 (a) shows the scanning cycle of the carriages 207 and 209, which are driven with the stepping motor 210. This Figure shows the speed of the carriages 207 and 209, namely, the relationship between the frequency applied to the stepping motor 210 and the duration of time, for the performance of forward scanning and backward scanning operations at the magnification of 50% for example, i.e. at the maximum traveling speed. At the time of acceleration, 259 Hz is multiplied progressively until it is increased to approximately 11 or 12 KHz in the maximum, as shown in FIG. 18 (b), The generation of pulses is simplified by giving regularity to the pulse line in this manner. Then, as shown in FIG. 18 (a), regular acceleration is given in stages at 259 pps/3.9 ms, thereby forming a trapezoidal profile. Also, a pause period is provided between the forward scanning operation and the backward scanning operation to wait for the decrease of the vibrations in the IIT mechanism system and also to set these operations in synchronization with the output of images from the IOT. In the present example of preferred embodiments, the rate of acceleration is set at 0.7 G, and, by thus setting the acceleration at a value larger than that in the conventional system, a reduction is attained in the time needed for the scanning cycle.

Figure 18A:
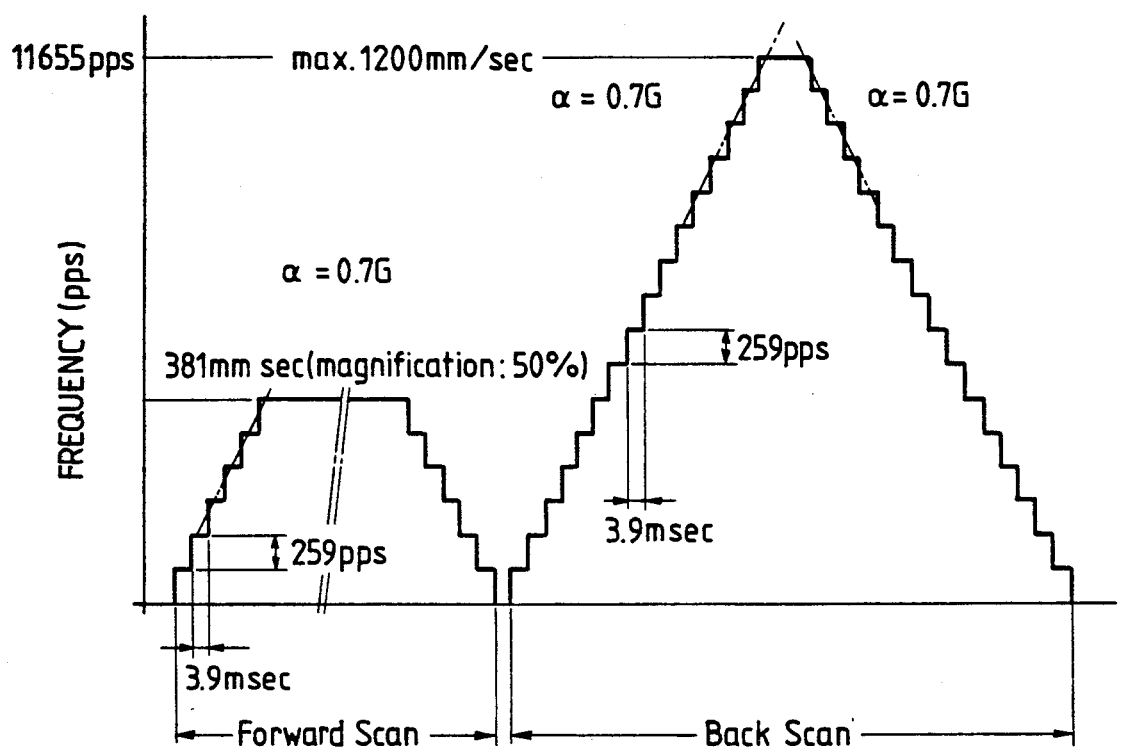
FIGS. 18a-18e illustrates the control of the carriage motor.
Figure 18B:
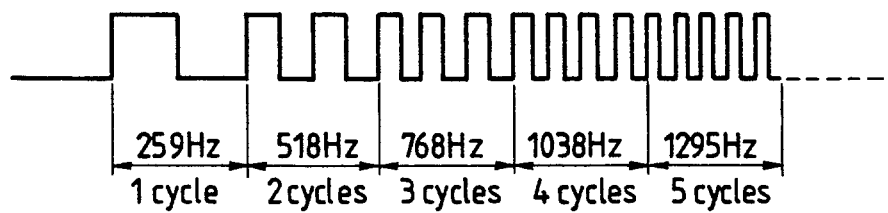
Figure 18C:
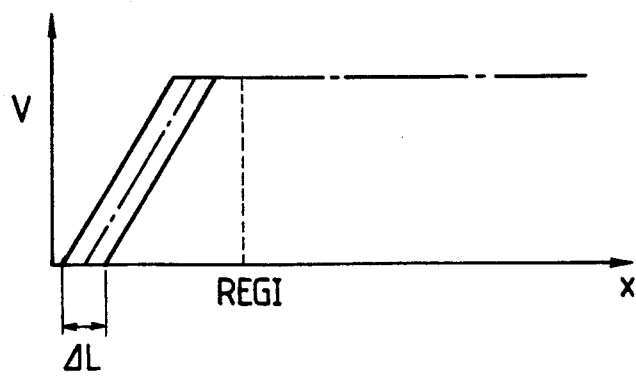
Figure 18D:
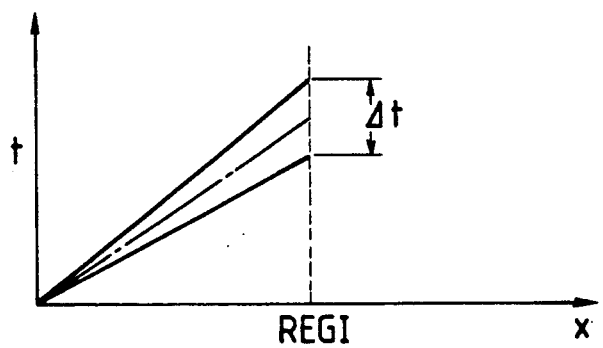
Figure 18E:
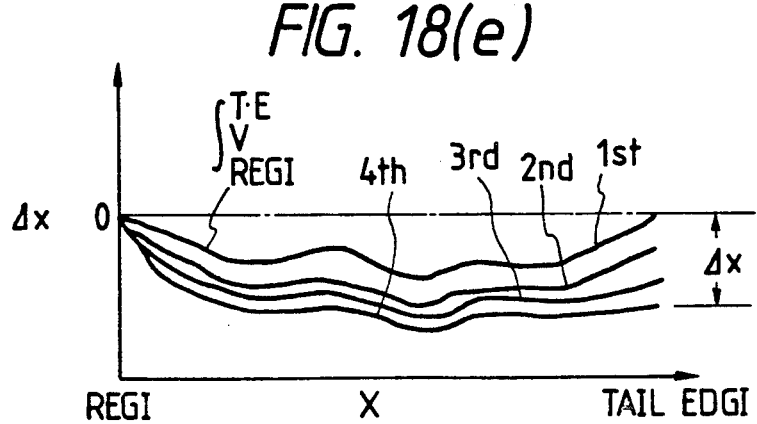

If a color original sheet is to be read, it will be a major task to find a way to reduce the deviation in the position for registration through the scanning operation which is performed four times and the resulting deviation of colors or the distortion of images. FIGS. 18(c) through 18(e) are charts for explaining the causes of color deviations. FIG. 18 (c) shows that the position where the imaging unit stops upon completion of its scanning operation is different from its real home position, and, due to a deviation in the duration of time required for the arrival of the imaging unit to the registering position, a deviation in colors takes place. Moreover, as shown in FIG. 18 (d), a color deviation occurs because of a deviation which occurs in the duration of time required for the arrival of the imaging unit to the registering position because of the transient vibrations of the stepping motor (which are the fluctuations in the speed of the motor before it attains its normal operating speed) within the four scanning operations. Moreover, FIG. 18 (e) shows the dispersion of the characteristics for the normal operating speed of the motor for the duration of time from the time when the imaging unit passes the registering position to the time when it reaches the tail edge, and the Figure indicates that the dispersion of the fluctuations in the speed in the course of the initial scanning operation is larger than the dispersions of the fluctuations of the speed in the second through the fourth scanning operations. Accordingly, it is designed to develop yellow (Y) in the initial scanning operation since the color is less conspicuous even if it is registered with a color deviation.

The conceivable causes of the color deviations mentioned above include the secular change affecting the timing belts 213 and 215 and such mechanical instability factors as the viscous resistance between the sliding pads for the carriages 207 and 209 and the sliding rails which guide these carriages.

Next, a description is given of the construction of the video signal processing system for the IIT 32.

Figure 19:
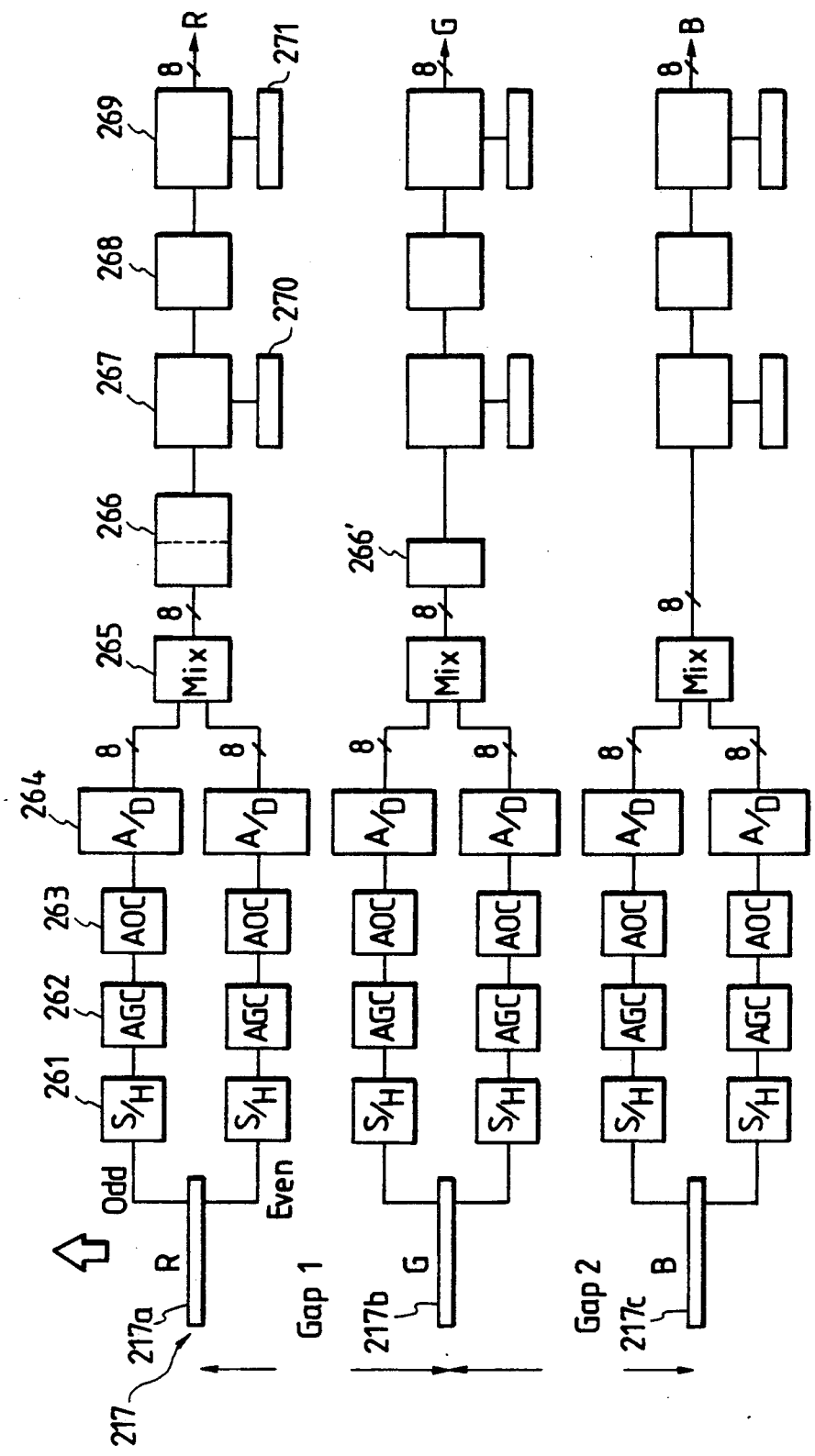
FIG. 19 illustrates the video signal processing circuit.
Figure 20:
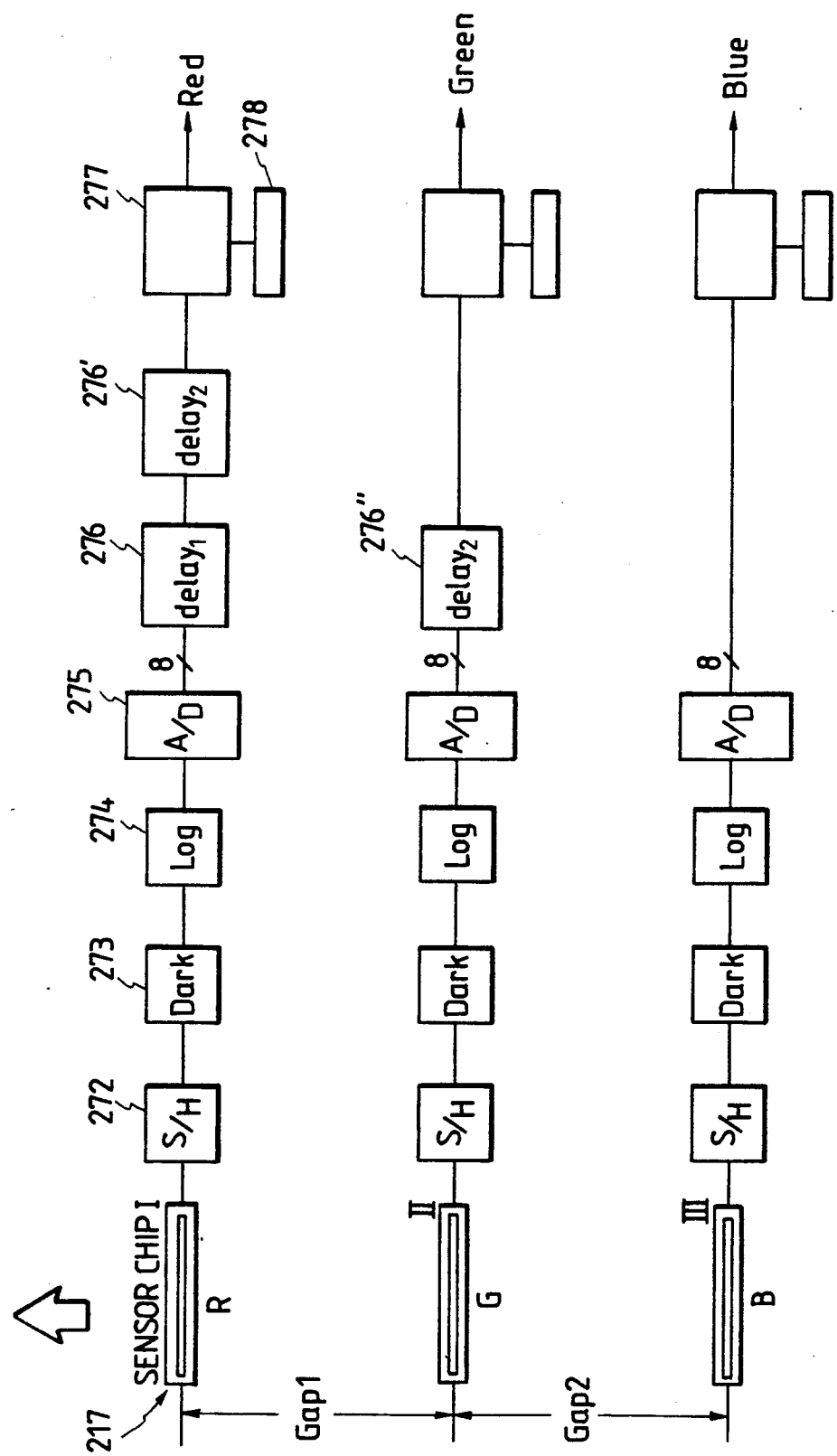
FIG. 20 illustrates another video signal processing circuit.

FIG. 19 and FIG. 20 illustrate examples of the construction the video signal processing system.

As shown in FIG. 19, the three color linear sequential sensor 217 is composed of a sensor 217a for the line of picture elements provided with a color filter having spectral sensitivity to red (R), a sensor 217b for the line of picture elements provided with a color filter having spectral sensitivity to green (G), and a sensor 217c for the line of picture elements provided with a color filter having spectral sensitivity to blue (B). The sensor outputs the video signals obtained from the light reflected from the color original sheet after it converts the video signals into video signals processed for their color decomposition into R, G, and B and divided between picture elements in the even number positions (Even) and those in the odd number positions (Odd). The video signal processing circuit shown in the Figures is provided with a sample hold circuit 261, a gain control circuit AGC (Automatic Gain Control) 262, an offset control circuit AOC (Automatic Offset Control) 263, an analog-digital (A/D) conversion circuit 264, a mixer 265, gap correcting memory devices 266 and 266', shading correction circuit 267 and 270, and a logarithmic conversion table 268. This video signal processing circuit performs sample holding of the analog video signals output from the three color linear sequential sensor 217 and adjusts the gain of the signals, and the circuit thereafter converts the processed analog video signals into digital signals with their offset adjustment and then, mixing the picture elements in the even number positions and those in the odd number positions, performs their gap correction, shading correction, and their conversion from the brilliance signals into density signals.

The gap correction memory devices 266 and 266' correct the gap components between the individual lines of picture elements, and they are composed of line memory devices in the FIFO construction. Then, the amount of correction is adjusted in correspondence to the changes with the sampling density when the density is varied in the subsidiary scanning direction in accordance with the ratio of magnification or reduction. After storing the signals from the lines of picture elements which are scanned in advance on the original sheet, the memory devices synchronize the signals of the individual lines of picture elements and output them.

The logarithmic conversion table 268 is a look-up table (LUT), for example, in a ROM construction for converting the signals from the reflected light into density signals, and is used for converting the color decomposition signals obtained on the colors R, G, and B from the light reflected from the original sheet into the signals representing the density of R, G, and B. The shading correction circuits 267 and 270 are provided with SRAM 269 and 272 and perform shading correction, adjustments of the input of the image data, and so forth.

The shading correction is performed by a process consisting of writing the reference data to the SRAM and outputting the data by deducting the reference data from the image input data, and, by this process, the shading correction circuits corrects the dispersions due to the light distribution characteristics of the light source and the secular changes in the light source, the dispersions affecting the optical system because of the soiling or the like of the reflecting mirror and the lens, and the dispersions in sensitivity among the individual picture elements in the three color linear sequential sensor 217. Among the circuits which perform these processes, one of the shading correction circuits 267 is connected to the front stage of the conversion table 268 and performs the correction for the dark level (which represents the dark time output at the time when the fluorescent lamp 201 is turned off), while the other shading correction circuit 269, which is connected to the rear stage of the conversion table 268, performs the correction for the output generated by reading the white color reference board. With this construction, the dark time output data and the data read from the white color reference board are written as the reference data respectively to the SRAM 270 and 271.

FIG. 20 presents an example of the construction of a further simplified circuit.

The example shown in FIG. 20 represents a system with a three color linear sequential sensor 217 which serially outputs the video signals for each of the channels I, II, and III without dividing the signals between the even number side and the odd number side. To the three color linear sequential sensor 217 are connected the circuits forming three systems in correspondence to the individual channels I, II, and III for the lines of picture elements as processed for color decomposition, and each of these systems is provided with a sample hold circuit 272, a dark processing circuit 273, which clamps the video signals at the dark level taken as the reference level, a logarithmic conversion circuit 274, which converts the video signals into density values, an analog-digital (A/D) conversion circuit 275, which converts the analog video signals into digital signals, gap correction memory devices 276, 276', and 276", and a shading correction circuit 277.

The gap correction memory devices 276, 276', and 276" are memory devices of an identical size, and, when it is assumed that the length of the gap on the surface of the original sheet is 875 [micro]m and that the size of one picture element is 16 dots/mm and 62.5 [micro]m, the gap correction memory device 276" needs a memory capacity large enough to perform the interpolation of:

$$875/62.5 = 14 \text{ lines}$$

That is to say, the memory device 276" requires a memory capacity of 70K bytes as expressed in the following equation:

$$8 \times 5,000 \times 14 = 70K \text{ bytes}$$

Therefore, the gap correction memory devices 276 and 276' need two times as much memory capacity as the capacity just mentioned, namely a memory capacity sufficient for 28 lines or 140K bytes. The memory capacity required for the gap memory devices as a whole is 210K bytes in total. Moreover, the shading correction circuit 277 stores the data obtained by reading the white area (i.e. the white color reference board) in the SRAM 278 in advance and performs the white shading correction by a deduction of this value from the input image data.

Next, a description is given of an outline of the operation of the video signal processing system following the flow of image signals.

First, the three color linear sequential sensor 217 reads the original sheet and separates the images thereon into R, G, and B and then distributes the signals between the even number side (Even) and the odd number side (Odd) for each line of picture elements, thereafter transmitting the video signals to the sample hold circuit (SH) 261. Then, the sample hold circuit (SH) 261 holds these video signals with the sample holding pulses and eliminates the noise in the signals. The video signals thus processed for sample holding are then processed for the correction of their gain and offset respectively by the gain control circuit (AGC) 262 and the offset control circuit (AOC) 263 and thereafter are converted into digital signals by the analog-digital (A/D) conversion circuit 275. The converted signals for the even number side and those for the odd number side are then synthesized by the mixer 265. Of the synthesized signals for R, G, and B, those signals for the preceding line of picture elements are delayed for correction by the amount of the gap with the gap correction memory devices 266 and 266', and the image data are thereby synchronized. Then, after the correction of the dark level is made by the shading correction circuit 267, the conversion into density is performed with the logarithmic conversion table 268 and the correction of the white level is made with the shading correction circuit 269.

Moreover, a color detecting sample scanning mode is available separately from the copy scanning mode described above. In this color detecting scanning mode, first the IIT carriages 207 and 209 are moved to the points specified for color detection and then, after the elapse of 50 ms, for example, the density data derived from the reading of the original sheet are written to the SRAM and thereafter the data on the specified picture elements are transferred to the RAM of the VCPU (not shown in the Figure). In this regard, the 50 mS mentioned above represents the time that elapses before the carriages 207 and 209 of the IIT 32 cease to make their vibrations and come to a standstill. For the takeup of data, five picture elements in the main scanning direction and five picture elements in the subsidiary scanning direction, for example, are specified as the objects. In this case, the picture element data at the specified point and the five subsequent points are selected out of the picture element data for one line in the main scanning direction as stored in the SRAM and read into the RAM of the VCPU, and further the IIT carriages 207 and 209 are moved by one pulse at a time for four times in total, in which the picture elements data are processed for their reading into the RAM also for every five points. The process described above is the one performed in a case where the specified point is one point. Accordingly, in a case where there are a plural number of such specified points, the same process is performed repeatedly for each of the specified points.

As the three color linear sequential sensor 217 reads the light reflected from the original sheet when light is shed onto it with a fluorescent lamp 201, the read signal level will be progressively higher as white is intensified, i.e. in proportion to the reflection factor. On the contrary, the level of the signals output from the three color linear sequential sensor 217 when the fluorescent lamp remains turned off (i.e. the dark time output level or the dark level) indicates the minimum level. This dark level is not flat, and has a dispersion, even for one chip. Ordinarily, the white color signal (namely, the signal read from the white color reference board) of the three color linear sequential sensor 217 and the black color signal (i.e. the dark time output) have dispersions for each channel and further for each of the picture elements in each channel.

Therefore, in image reading equipment which uses a three color linear sequential sensor 217 like this, it is the gain control circuit (AGC) 262 that adjusts the gain and guarantees proper chromatic gradations and it is the offset control circuit that jacks up the minimum value of this dark level to a certain value, thereby guaranteeing a raised dark time level. The gain control circuit (AGC) 262, which performs this function, controls the gain in such a way as to adjust the maximum value (the peak value) of the white color signals of the individual channels, taking "200", for example, in 256 chromatic grades as the reference value for the analog-digital output level, and the offset control circuit (AOC) 263 takes "10", for example, in 256 chromatic grades as the reference value for the analog-digital output level and then controls the offset value in such a manner as to adjust the minimum value of the black color signal to this reference value.

The gain control circuit first writes the data read from the white color reference board to the SRAM of the white color shading circuit, for example. Thereafter, the VCPU performs its sampling of the data read from the SRAM at the prescribed picture element intervals, thereby obtaining the maximum value, and then performs the gain control in such a way that this maximum value will become the prescribed output, i.e. 200, for example, in 256 chromatic grades.

In the offset control, the dark time output is written to the SRAM 271 in the white color shading correction circuit 269, with the logarithmic conversion table 268 set in its through state, for example, and thereafter the VCPU, reading the data from the SRAM 271, performs its sampling of the read data at the prescribed picture element intervals and obtains the minimum value. Then, the VCPU sets such an offset value that this minimum value will generate the prescribed output, namely, 10, for example, in 256 chromatic grades. The offset control is performed in this manner, lowering the minimum value, if it is any larger than the reference value for the analog-digital output level, to the said reference value but increasing the minimum value, on the contrary, to the said reference value if the minimum value is any smaller than the said reference value.

Moreover, in case the analog-digital (A/D) conversion circuit 264 is a circuit which converts the input signals for the input range from 0 to 2.5 V into digital signals in eight bits in one byte for 0 to 255, it is possible to increase the reading accuracy by setting the level of the signals read from the white color reference board at a value approximating 2.5 V. However, as the reflection factor of the white color reference board is approximately 80%, there will be a problem in that a saturation occurs with the brighter range of white from the original sheet in case the level of this read signal is raised, for example, to approximately 2.3 V. Therefore, gain control is applied in such a manner as to set the level of the signal obtained by reading the white color reference board at approximately 2.0 V, and this is divided into 256 equal portions and these are converted into digital signals, and yet, along with a decline in the quantity of light from the fluorescent lamp 201 through its use, even the signals read from the same white color reference board will suffer a gradual decline in their level, with a resultant decline in resolution.

The gain control (AGC) circuit 262 secures stable resolution even in such a case, and, in case the level of the signals read from the white color reference board are set at 2.0 V, for example, the gain control circuit controls the gain in such a way that the level of the signals is constantly maintained at this value and sets the optimum gain even in those chips which have a dispersion in the sensitivity of the sensor.

However, the individual picture elements do not have an equal signal level merely by operation of the gain control and the offset control. The images may be coarse or may show streaks in the high density region. The [triangle]V dark correction (i.e. the dark shading correction) corrects the dispersion in dark signal level among the individual picture elements while the white shading correction corrects the dispersion in signal level among the individual picture elements, taking each of them as the unit.

In the [triangle]V dark correction, the dark time output is written to the SRAM 271 of the white shading correction circuit 269, with the logarithmic conversion table 268 set in the through state, and the VCPU thereafter reads the data of this SRAM 271, and, repeating this process four times, the VCPU works out the mean value, which it writes to the SRAM 270 of the dark shading correction circuit 267.

When the gain control, the offset control, and the [triangle] V dark correction have been performed in the manner described above, the system is ready to shift to the copying operation. In the copying operation, the VCPU performs the process of writing the reference data to the SRAM 271 of the white shading correction circuit 269 prior to the shift to the copying cycle. In this process, the VCPU performs the reading of the white color reference board and the writing of the read data as the reference data to the SRAM 271 after it has performed the gain control, the offset control, and the [triangle] dark correction. Accordingly, the data written to the SRAM 271 of the white shading correction circuit 269, which is expressed as $D_W$, and the correction data written to the SRAM 270 of the dark shading correction circuit 267, which is expressed as $D_D$, are in the relationship expressed in the following equation:

$$\log (D_W - D_D)$$

Now, when it comes to the actual copying cycle, the data read out of the original sheet, $D_X$, are first processed for triangle]V dark correction in the dark shading correction circuit 267, and the data input into the white shading correction circuit 269 will be as expressed in the following equation:

$$\log (D_X - D_D)$$

Therefore, with the deduction of the reference data written to the SRAM 270 in the dark shading correction circuit 267 from this data, the data will be as expressed in the following equation:

$$\log (D_X - D_D) - \log (D_W - D_D)$$

That is to say, the density signal will undergo the process of correction as expressed in the following equation as the result of the corrections by the dark shading correction circuit 267 and the white shading correction circuit 271:

$$= \log \frac{\log(D_X - D_D) - \log(D_W - D_D)}{D_W - D_D} = \log R$$

The reflected signal will undergo the process of correction as expressed in the following equation:

$$R = \frac{D_X - D_D}{D_W - D_D}$$

The [triangle]V dark correction, which performs correction on the basis of the black color signal in this manner, is made of the reflected signal prior to its logarithmic conversion. The white shading correction performed on the basis of white color is made of the density data after the logarithmic conversion, and this approach works with a smaller value for the corrections and achieves a higher efficiency in the correcting processes. Also, the SRAM 270 and 271 are used to store the correction data for one line therein, and, with the correcting processes performed by deductions of these data, it is possible to use a general-purpose adder IC, which makes it possible to perform arithmetic operations in a simple way. This setup of the processes also renders it unnecessary to build a hard logic divider with the complicated and large-scale circuitry as is used in the conventional system.

Next, a description is made of the control of the IIT 32 will be provided.

The IIT remote unit performs the sequential control of the various kinds of copying operations, the service support functions, the self-diagnostic functions, and the fail safe functions. The sequential control functions by the IIT remote unit are divided into ordinary scanning, sample scanning, and initializing functions. The various kinds of commands and parameters for the control of the IIT remote unit are transmitted by serial communications from the SYS remote unit 71.

In the ordinary scanning process, the paper size and the magnification are set as the scanning length data in the range from 0 to 432 mm (at a 1 mm step), and the scanning speed is set on the basis of the magnification (ranging from 50% to 400%). The prescanning length data (for the distance from the stopping position to the registering position) is also set on the basis of the magnification (from 50% to 400%).

In the ordinary scanning process, the fluorescent lamp is first turned on by the FL-ON signal upon the reception of the scanning command, and a motor driver is turned on by the SCN-RDY signal, and, after the elapse of the prescribed timing, the scanning operation is started. Then, when the IIT reaches the registering position, the image area signal IMG-AREA assumes the low level for the prescribed scanning length, and, in synchronization with this, the IIT-PS signal is output to the IPS.

The sample scanning function is used for the color detection at the time of color conversion, for the correction of the color balance at the time when the F/P is used, and for the shading correction. In this sample scanning process, the first carriage 207 and the second carriage 209 are moved to and stopped at the position of the specified sample as measured from the registering position, the traveling speed, the number of minute operations, and the step intervals, and the collection of the sample data is performed.

In the initializing process of the IIT, the IIT performs the verification of the registering sensor, the verification of the operations of the imaging unit by the registering sensor, and the correction of the home position of the imaging unit by the registering sensor upon the reception of the command from the SYS remote unit when the power is turned on.

In this regard, a total memory capacity of 210K bytes is necessary for the gap correction memory devices, 276, 276', and 276" in the processing circuit shown in FIG. 20, and, in case it is intended to obtain the signals for enlarged copying with an increase in the sampling density in the subsidiary scanning direction, it is necessary to increase the memory capacity by the additional memory usage for the purpose. For example, if it is attempted to increase the reduction and enlargement ratio to 400%, the sampling density in the subsidiary scanning direction will be: $16 \times 4 = 64$ dots/mm, and the additional requirement of the memory capacity will be four times as large, i.e. 840K bytes or more.

In the meanwhile, the usage of the color image reading equipment can be divided into two major categories, one being its use for full-color reading, for which it is necessary to read with high fidelity those original sheets which are generally called "pictorial originals", such as color photographs and pictures and printed materials and the other being its use in reading the so-called functional original sheets, such as those for which it is sufficient to distinguish a total of eight colors, C, M, Y, R, G, B, K, and W, for example. The processing circuits shown in FIG. 19 and FIG. 20 can be applied to full- color reading, and can also be used for the copying of functional original sheets.

Furthermore, the present invention is not limited to the examples of its preferred embodiments described hereinabove, but can be embodied in various modifications of its design. For example, the example of preferred embodiments given above proposes a mounting bracket 235 which is rotated by the amount of the tolerance for its fit with the stud bolt 234, the present invention permits the installation of the mounting bracket 235 to the supporting bracket 281 with the shaft 282 in such a manner as to permit its free rotating motion. If installed in this manner, the mounting bracket 235 will rotate smoothly, with the effect that it attains favorable rotating performance and also that it has a larger rotating angle.

Figure 23A:
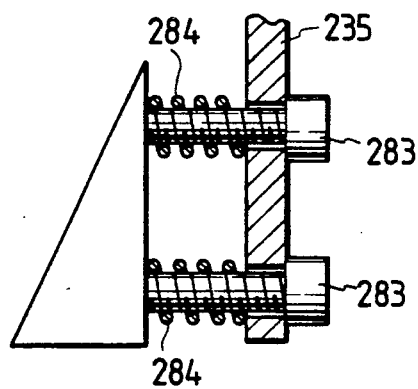
FIGS. 23a-23b illustrates still another example of the adjusting mechanism in the tilting direction.
Figure 23B:
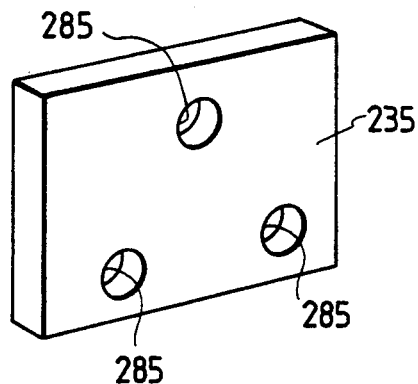
Figure 24:
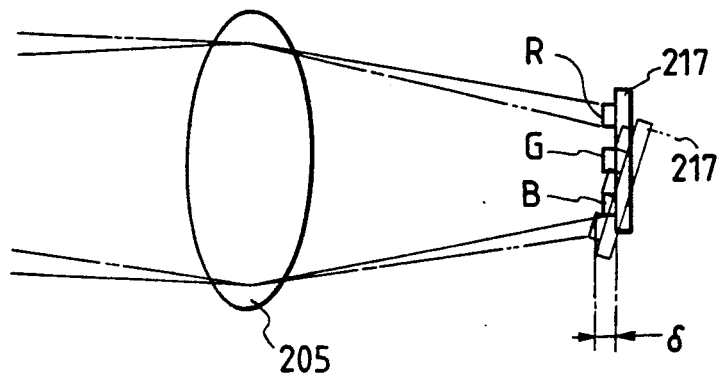
FIG. 24 illustrates the input of a slanted optical image into the reading sensor.

Also, as shown in FIG. 23, the mounting bracket 235 can be made adjustable at all of the three points by means of the screw 283 and the spring 284 in replacement of the stud bolts 234 at all of the three points. In such a case, it is sufficient just to make a plain hole 285 in the mounting bracket. If constructed in this manner, the mounting bracket 235 will be able to rotate in the tilting direction and in the upward and downward direction and is simple in construction and low in cost.

As it is evident from the description given in the foregoing part, the present invention makes it possible to adjust the reading sensor in any of the six directions and therefore to install the reading sensor with a high degree of precision. Accordingly, the system embodying the present invention can read the images on the original sheet without any deterioration of the resolution.

Moreover, the present invention offers simplicity in adjustment and reduces the time needed for the adjustment since it proposes adjustments be made in the area alloted for the installation of the reading sensor after the positioning of the optical lens and at the same time concentrates the adjusting points in one place. In addition, by the effect of the concentration of the adjusting points, the present invention makes it possible to form the adjusting mechanism in a compact size and in a light weight.

Moreover, as the present invention reveals a system for making adjustments of the optical lens via a speed reducing means, it is possible to make fine adjustments even if a large optical lens is employed, so that the optical lens can be mounted with a high degree of precision and with high stability.

Furthermore, since a plate spring and screws set with spring washers are used in the apparatus proposed by the present invention, the apparatus is capable of applying constant thrust with stable spring force and also permits its easy assemblage, realizing improved working efficiency and effective space-saving.

What is claimed is:

1. A method of adjusting an image reading device which processes an optical image from an original sheet as transmitted onto an optical sensor from a plurality of mirrors and an optical lens, comprising the steps of: adjusting the location of the sensor by moving the sensor in any of three perpendicular axial directions and rotating the sensor around any of these three axes; and wherein the adjustments may be made in the x-axis direction (the optical axis direction), around the x-axis, in the y-axis direction (the main scanning direction), around the y-axis, in the z-axis direction (the top to bottom axis direction), and around the z-axis.

2. A method of adjusting an image reading device as defined in claim 1, further including a step of finally adjusting the reading sensor position at a reduced speed in relation to an original adjustment.

3. A method of adjusting an image reading device which processes an optical image form an original sheet as transmitted onto an optical sensor from a plurality of mirrors and an optical lens, comprising the steps of: adjusting the location of the sensor by moving the sensor in any of three perpendicular axial directions and rotating the sensor around any of these three axes;

wherein the adjustments may be made in the x-axis direction (the optical axis direction), around the x-axis, in the y-axis direction (the main scanning direction), around the y-axis, in the z-axis direction (the top to bottom axis direction), and around the z-axis;

further including a step of finally adjusting the reading sensor position at a reduced speed in relation to an original adjustment; and wherein said step of finally adjusting is performed by using an eccentric cam surface to control the amount of the adjustment.

4. A method of adjusting an image reading device which processes an optical image from an original sheet as transmitted onto an optical sensor from a plurality of mirrors and an optical lens, comprising the steps of: adjusting the location of the sensor by moving the sensor in any of three perpendicular axial directions and rotating the sensor around any of these three axes;

wherein the adjustments may be made in the x-axis direction (the optical axis direction), around the x-axis, in the y-axis direction (the main scanning direction), around the y-axis, in the z-axis direction (the top to bottom axis direction), and around the z-axis;

further including a step of finally adjusting the reading sensor position at a reduced speed in relation to an original adjustment; and wherein said step of finally adjusting is performed by using a rack and pinion mechanism to control the amount of the adjustment.

5. A method of adjusting an image reading sensor as defined in claim 1, wherein the position of the image sensor is first adjusted along the x-axis, is next adjusted along the z-axis, is next adjusted around the x-axis, is next adjusted around the z-axis, is next adjusted around the y-axis, and is then adjusted along the y-axis.

6. A method of adjusting an image reading sensor as defined in claim 2, wherein the position of the image sensor is first adjusted along the x-axis, is next adjusted along the z-axis, is next adjusted around the x-axis, is next adjusted around the z-axis, is next adjusted around the y-axis, and is then adjusted along the y-axis.

7. A method of adjusting an image reading sensor as defined in claim 3, wherein the position of the image sensor is first adjusted along the x-axis, is next adjusted along the z-axis, is next adjusted around the x-axis, is next adjusted around the z-axis, is next adjusted around the y-axis, and is then adjusted along the y-axis.

8. A method of adjusting an image reading sensor as defined in claim 4, wherein the position of the image sensor is first adjusted along the x-axis, is next adjusted along the z-axis, is next adjusted around the x-axis, is next adjusted around the z-axis, is next adjusted around the y-axis, and is then adjusted along the y-axis.

9. A method of adjusting an image reading sensor as defined in claim 1, wherein the position of the image sensor is first adjusted along the x-axis, is next adjusted around the x-axis, is next adjusted along the z-axis, is next adjusted around the z-axis, is next adjusted around the y-axis, and is then adjusted along the y-axis.

10. A method of adjusting an image reading sensor as defined in claim 2, wherein the position of the image sensor is first adjusted along the x-axis, is next adjusted around the x-axis, is next adjusted along the z-axis, is next adjusted around the z-axis, is next adjusted around the y-axis, and is then adjusted along the y-axis.

11. A method of adjusting an image reading sensor as defined in claim 3, wherein the position of the image sensor is first adjusted along the x-axis, is next adjusted around the x-axis, is next adjusted along the z-axis, is next adjusted around the z-axis, is next adjusted around the y-axis, and is then adjusted along the y-axis.

12. A method of adjusting an image reading sensor as defined in claim 4, wherein the position of the image sensor is first adjusted along the x-axis, is next adjusted around the x-axis, is next adjusted along the z-axis, is next adjusted around the z-axis, is next adjusted around the y-axis, and is then adjusted along the y-axis.

13. An image reading apparatus containing a frame and a position adjusting device for a reading sensor which receives optical images reduced in size by means of an optical lens system, comprising:

a base plate for positioning said reading sensor in an optical axis of said optical lens, said base plate being detachably mounted to said frame of said image reading apparatus;

a first adjusting member detachably mounted on said base plate to position said sensor around an upward and downward (Z-axis) axis;

a second adjusting member detachably mounted on said first adjusting member to position said sensor in a main scanning axis;

a third adjusting member detachably mounted on said second adjusting member to position said sensor in the direction of the upward and downward axis and around the optical axis; and a mounting bracket detachably mounted on said third adjusting member to position said sensor around the main scanning axis.

14. An image reading apparatus containing a frame and a position adjusting device for a reading sensor which receives optical images reduced in size by means of an optical lens system, comprising:

a base plate for positioning said reading sensor in an optical axis of said optical lens, said base plate being detachably mounted to said frame of said image reading apparatus;

a first adjusting member detachably mounted on said base plate to position said sensor around an upward and downward (Z-axis) axis;

a second adjusting member detachably mounted on said first adjusting member to position said sensor in a main scanning axis;

a third adjusting member detachably mounted on said second adjusting member to position said sensor in the direction of the upward and downward axis and around the optical axis; and a mounting bracket detachably mounted on said third adjusting member to position said sensor around the main scanning axis; and wherein one of said first adjusting member, second adjusting member and third adjusting member comprises an eccentric cam.

15. An image reading apparatus containing a frame and a position adjusting device for a reading sensor which receives optical images reduced in size by means of an optical lens system, comprising:

a base plate for positioning said reading sensor in an optical axis of said optical lens, said base plate being detachably mounted to said frame of said image reading apparatus;

a first adjusting member detachably mounted on said base plate to position said sensor around an upward and downward (Z-axis) axis;

a second adjusting member detachably mounted on said first adjusting member to position said sensor in a main scanning axis;

a third adjusting member detachably mounted on said second adjusting member to position said sensor in the direction of the upward and downward axis and around the optical axis;

a mounting bracket detachably mounted on said third adjusting member to position said sensor around the main scanning axis; and wherein one of said first adjusting member, second adjusting member and third adjusting member comprises a speed reducing mechanism.

16. A position adjusting device for a reading sensor as defined in claim 15, wherein the speed reducing mechanism comprises an eccentric cam.

17. A position adjusting device for a reading sensor as defined in claim 14, wherein said eccentric cam is held in an adjusting position by means of a compression spring.

18. A position adjusting device for a reading sensor as defined in claim 16, wherein said eccentric cam is held in an adjusting position by means of a compression spring.

19. A position adjusting device for a reading sensor according to claim 13, further including a stud bolt having a head and protruding from the third position adjusting member, and wherein said mounting bracket is rotatable about said stud bolt by an amount determined by a fitting tolerance between the bracket and the stud bolt.

20. A position adjusting device for a reading sensor according to claim 14, further including a stud bolt having a head and protruding from the third position adjusting member, and wherein said mounting bracket is rotatable about said stud bolt by an amount determined by a fitting tolerance between the bracket and the stud bolt.

21. A position adjusting device for a reading sensor according to claim 15, further including a stud bolt having a head and protruding from the third position adjusting member, and wherein said mounting bracket is rotatable about said stud bolt by an amount determined by a fitting tolerance between the bracket and the stud bolt.

22. A position adjusting device for a reading sensor according to claim 16, further including a stud bolt having a head and protruding from the third position adjusting member, and wherein said mounting bracket is rotatable about said stud bolt by an amount determined by a fitting tolerance between the bracket and the stud bolt.

23. A position adjusting device for a reading sensor according to claim 17, further including a stud bolt having a head and protruding from the third position adjusting member, and wherein said mounting bracket is rotatable about said stud bolt by an amount determined by a fitting tolerance between the bracket and the stud bolt.

24. A position adjusting device for a reading sensor according to claim 18, further including a stud bolt having a head and protruding from the third position adjusting member, and wherein said mounting bracket is rotatable about said stud bolt by an amount determined by a fitting tolerance between the bracket and the stud bolt.

25. A position adjusting device for a reading sensor as defined in claim 19, further including a compression spring mounted on said stud bolt, and wherein said mounting bracket is held between said compression spring and said head of the stud bolt.

26. A position adjusting device for a reading sensor as defined in claim 20, further including a compression spring mounted on said stud bolt, and wherein said mounting bracket is held between said compression spring and said head of the stud bolt.

27. A position adjusting device for a reading sensor as defined in claim 21, further including a compression spring mounted on said stud bolt, and wherein said mounting bracket is held between said compression spring and said head of the stud bolt.

28. A position adjusting device for a reading sensor as defined in claim 22, further including a compression spring mounted on said stud bolt, and wherein said mounting bracket is held between said compression spring and said head of the stud bolt.

29. A position adjusting device for a reading sensor as defined in claim 23, further including a compression spring mounted on said stud bolt, and wherein said mounting bracket is held between said compression spring and said head of the stud bolt.

30. A position adjusting device for a reading sensor as defined in claim 24, further including a compression spring mounted on said stud bolt, and wherein said mounting bracket is held between said compression spring and said head of the stud bolt.

31. A position adjusting device for a reading sensor according to claim 19, further including a second bolt having a head and a screw having a nut, each of said first and second bolts and said screw having a compression spring mounted thereon and protruding from the third position adjusting member so that said mounting bracket is held between said three compression springs and said heads of said first and second bolts and said nut in such a manner as to permit the mounting bracket to rotate freely.

32. A position adjusting device for a reading sensor according to claim 20, further including a second bolt having a head and a screw having a nut, each of said first and second bolts and said screw having a compression spring mounted thereon and protruding from the third position adjusting member so that said mounting bracket is held between said three compression springs and said heads of said first and second bolts and said nut in such a manner as to permit the mounting bracket to rotate freely.

33. A position adjusting device for a reading sensor according to claim 21, further including a second bolt having a head and a screw having a nut, each of said first and second bolts and said screw having a compression spring mounted thereon and protruding from the third position adjusting member so that said mounting bracket is held between said three compression springs and said heads of said first and second bolts and said nut in such a manner as to permit the mounting bracket to rotate freely.

34. A position adjusting device for a reading sensor according to claim 22, further including a second bolt having a head and a screw having a nut, each of said first and second bolts and said screw having a compression spring mounted thereon and protruding from the third position adjusting member so that said mounting bracket is held between said three compression springs and said heads of said first and second bolts and said nut in such a manner as to permit the mounting bracket to rotate freely.

35. A position adjusting device for a reading sensor according to claim 23, further including a second bolt having a head and a screw having a nut, each of said first and second bolts and said screw having a compression spring mounted thereon and protruding from the third position adjusting member so that said mounting bracket is held between said three compression springs and said heads of said first and second bolts and said nut in such a manner as to permit the mounting bracket to rotate freely.

36. A position adjusting device for a reading sensor according to claim 24, further including a second bolt having a head and a screw having a nut, each of said first and second bolts and said screw having a compression spring mounted thereon and protruding from the third position adjusting member so that said mounting bracket is held between said three compression springs and said heads of said first and second bolts and said nut in such a manner as to permit the mounting bracket to rotate freely.

37. An image reading apparatus including a frame and a position adjusting device for a reading sensor, which receives optical images reduced in size by means of an optical lens system, comprising:

a base plate for independently positioning said optical lens system and said reading sensor in an optical axis direction said base plate being detachably mounted to said frame of said image reading apparatus;

a first adjusting member detachably mounted on said base plate to position said sensor around an upward and downward (z-axis) axis;

a second adjusting member detachably mounted on said first adjusting member to position said sensor in a main scanning direction;

a third adjusting member detachably mounted on said second adjusting member to position said sensor in the direction of the upward and downward axis and around the optical axis; and a mounting bracket detachably mounted on said third adjusting member to position said sensor around the main scanning direction.

* * * * *